US012675229B2

(12) United States Patent
Ng et al.

(10) Patent No.: US 12,675,229 B2
(45) **Date of Patent: \*Jul. 7, 2026**

(54) FABRIC MEMORY NETWORK-ON-CHIP EXTENSION TO ALM REGISTERS AND LUTRAM

(71) Applicant: Altera Corporation, San Jose, CA (US)

(72) Inventors: Bee Yee Ng, Bayan Lepas (MY); Ilya K. Ganusov, San Jose, CA (US); Scott Jeremy Weber, Piedmont, CA (US)

(73) Assignee: Altera Corporation, San Jose, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/725,307

(22) Filed: Apr. 20, 2022

(65) Prior Publication Data

US 2022/0244867 A1     Aug. 4, 2022

(51) Int. Cl.
G06F 3/06 (2006.01)

(52) U.S. Cl.
CPC .......... G06F 3/0626 (2013.01); G06F 3/0658 (2013.01); G06F 3/0673 (2013.01)

(58) Field of Classification Search
CPC ...... G06F 3/0601; G06F 3/061; G06F 3/0658; G06F 3/067; H03K 19/02; H03K 19/177; H03K 19/17728; H03K 19/17736
See application file for complete search history.

(56) References Cited

U.S. PATENT DOCUMENTS

| | | | | |
|---|---|---|---|---|
| 9,602,108 B1 * | 3/2017 | Gaide | .............. | H03K 19/17744 |
| 10,673,439 B1 * | 6/2020 | Ahmad | ............ | H03K 19/17728 |
| 10,833,679 B2 * | 11/2020 | Clark | ................. | H03K 19/1776 |
| 10,929,331 B1 * | 2/2021 | Camarota | ............... | G06F 13/20 |
| 12,164,462 B2 * | 12/2024 | Ganusov | ................ | H04L 45/60 |
| 2019/0140648 A1 * | 5/2019 | Clark | ................. | H03K 19/1776 |
| 2019/0379380 A1 * | 12/2019 | Atsatt | ................ | H03K 19/1737 |
| 2021/0013885 A1 * | 1/2021 | Atsatt | .............. | H03K 19/17756 |
| 2022/0221986 A1 * | 7/2022 | Weber | ................... | G06F 3/0656 |
| 2022/0244867 A1 * | 8/2022 | Ng | ......................... | G06F 3/0626 |
| 2023/0037575 A1 * | 2/2023 | Wu | ........................ | G06F 3/0679 |
| 2023/0056118 A1 * | 2/2023 | Clark | ................. | H03K 19/1776 |
| 2025/0321922 A1 * | 10/2025 | Weber | ................ | G06F 15/7825 |

OTHER PUBLICATIONS

U.S. Appl. No. 17/132,663, filed Dec. 23, 2020, Ilya K. Ganusov.

* cited by examiner

*Primary Examiner* — Jason M Crawford
(74) *Attorney, Agent, or Firm* — Fletcher Yoder, P.C.

(57) ABSTRACT

Systems or methods of the present disclosure may provide a programmable fabric including programmable logic. The programmable logic may include memory, a network-on-chip (NOC), and at least one micro NOC formed with hardened resources in the programmable fabric. Further, the at least one micro NOC may be communicatively coupled to the NOC and to the programmable logic. Additionally, the at least one micro NOC may selectively route data between the NOC and the programmable logic.

20 Claims, 19 Drawing Sheets

FABRIC MEMORY NETWORK-ON-CHIP EXTENSION TO ALM REGISTERS AND LUTRAM

BACKGROUND

The present disclosure relates generally to integrated circuits, such as field-programmable gate arrays (FPGAs). More particularly, the present disclosure relates to micro networks-on-chip (NOCs) that may be implemented on integrated circuits, including FPGAs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits can be utilized to perform various functions, such as encryption and machine learning. Moreover, various portions of integrated circuits may be utilized to perform various operations. For example, one portion of an integrated circuit may perform one function on data, and another portion of the integrated circuit may be utilized to further process the data. As data is to be processed, the data may be read from memory, and processed data may be written to the memory. NOCs may be utilized to route communications between different portions of an integrated circuit or between multiple integrated circuits. However, the communications between a NOC and adaptive logic modules (ALMs) dispersed within programmable fabric of an integrated circuit may utilize fabric resources (e.g., wires) or soft logic of the integrated circuit. Utilizing fabric resources or soft logic resources may result in a reduced efficiency of the integrated circuit because the fabric resources and the soft logic used to enable communication between the NOC and ALMs may not be usable for performing other various functions of the integrated circuit, such as processing data.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
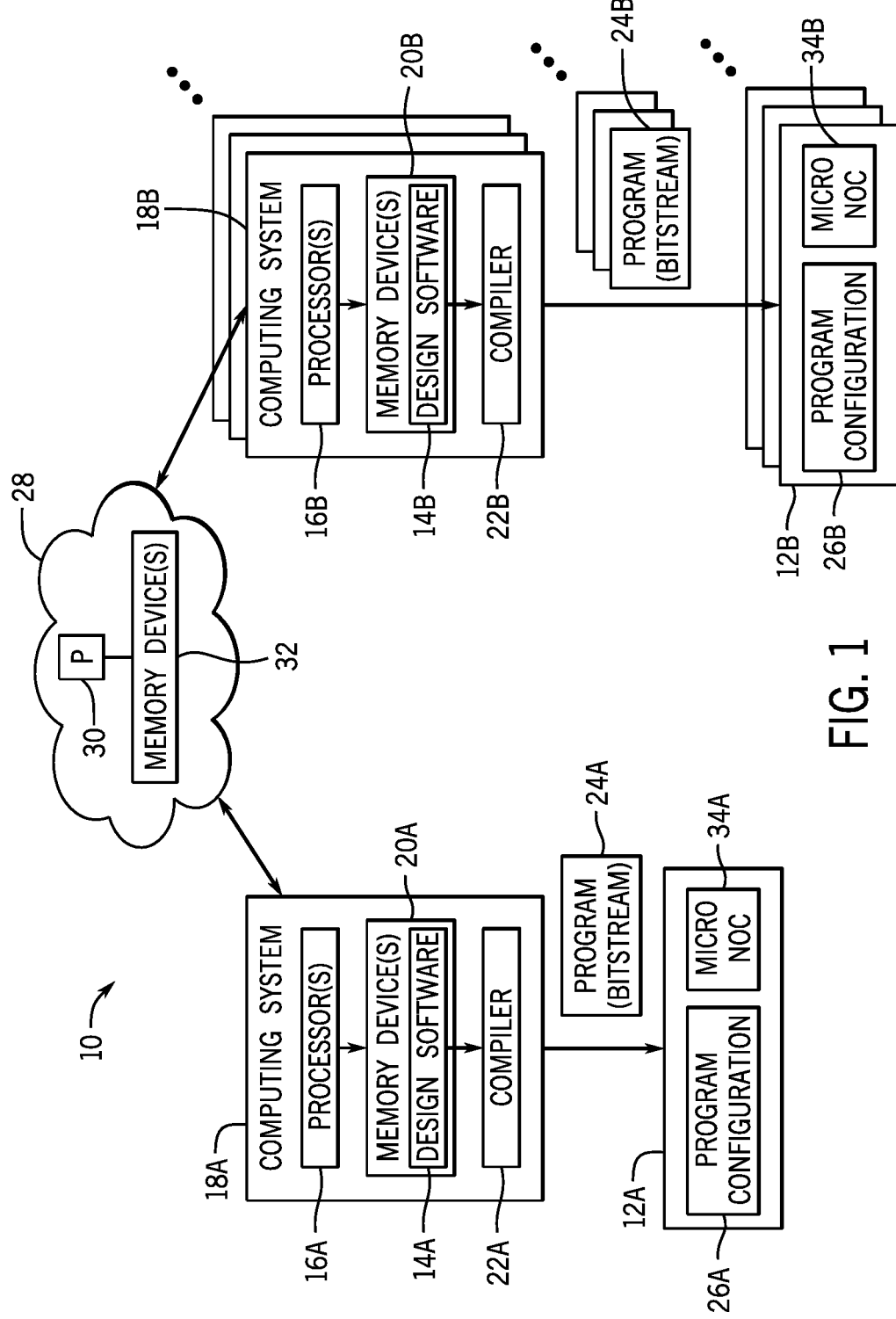
FIG. 1 is a block diagram of a system for implementing circuit designs on an integrated circuit device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, "hard logic" generally refers to portions of an integrated circuit device (e.g., a programmable logic device) that are not programmable by an end user, and the portions of the integrated circuit device that are programmable by the end user are considered "soft logic." For example, hard logic elements in a programmable logic device such as an FPGA may include arithmetic units (e.g., digital signal processing (DSP) blocks) that are included in the FPGA and unchangeable by the end user, whereas soft logic includes programmable logic elements included in the FPGA.

The present disclosure relates to embodiments of an integrated circuit that may include one or more networks-on-chip (NOCs) connected to one or more micro NOCs that are implemented as fixed (e.g., hardened) connections in the integrated circuit. The NOCs may provide hardened connections between the integrated circuit and other circuitry, and may be located on a shoreline of the integrated circuit or may traverse through the integrated circuit. The micro NOCs may connect to both the NOCs and programmable fabric of the integrated device to provide an interface between programmable fabric and the NOCs. The micro NOCs may be implemented within the programmable fabric to provide this connectivity. Further, in some embodiments, the micro NOCs may be significantly smaller than the NOCs outside of the programmable fabric and thus may impose a smaller footprint on the integrated circuit. For example, in some embodiments, the micro NOCs may use a smaller number of programmable logic memory columns than the NOCs outside of the programmable fabric (e.g., 8 columns vs 50 columns). Further, the micro NOCs may utilize smaller registers (e.g., a 1-bit register as opposed to a 32-bit data register). The micro NOCs may also be implemented with any other suitable registers, such as 2-bit registers, 4-bit registers, or the like. Due at least in part to these characteristics, a micro NOC may represent a small percentage of area of a programmable logic device (e.g., less than 1% of total fabric area).

In some embodiments, programmable fabric of the integrated circuit may include logic array blocks (LABs) and memory logic array blocks (MLABs), which may each include adaptive logic modules (ALMs) that include memory such as ALM registers and lookup table random-access memories (LUTRAMs (or also referred to as "LUTRAM")). The micro NOCs may be utilized to convey read/write requests and data associated with such requests between the LUTRAM and ALM registers of a given ALM and other portions (e.g., internal memory) of the integrated circuit device, as well as off-device circuitries such as external memory (e.g., via the shoreline NOC). Additionally, the micro NOCs may be implemented as described in U.S. patent application Ser. No. 17/132,663, entitled "MICRO-NETWORK-ON-CHIP AND MICROSECTOR INFRA-STRUCTURE," which is incorporated by reference in its entirety for all purposes. It should be noted that while U.S. patent application Ser. No. 17/132,663 describes an embodiment of a micro NOC, other embodiments of micro NOCs may be used.

Further, circuitry in the integrated circuit may be dedicated to switching operations between micro NOC read/write communications and user communications. Further, while in a micro NOC mode, a control signal may be asserted to select the desired location within the integrated circuit (for example, which LAB/MLAB) to transmit read/write signals. In this way, the speed and flexibility of communications within the integrated circuit may be improved.

With the foregoing in mind, FIG. 1 illustrates a block diagram of a system 10 that may be used to program one or more integrated circuit device 12 (e.g., integrated circuit devices 12A, 12B). The integrated circuit device 12 may be reconfigurable (e.g., FPGA) or may be an application-specific integrated circuit (ASIC). A user may implement a circuit design to be programmed onto the integrated circuit device 12 using design software 14 (e.g., design software 14A, 14B), such as a version of Intel® Quartus® by INTEL CORPORATION.

The design software 14 may be executed by one or more processors 16 (e.g., processors 16A, 16B) of a respective computing system 18 (e.g., computing system 18A, 18B). The computing system 18 may include any suitable device capable of executing the design software 14, such as a desktop computer, a laptop, a mobile electronic device, a server, or the like. The computing system 18 may access, configure, and/or communicate with the integrated circuit device 12. The processor(s) 16 may include multiple microprocessors, one or more other integrated circuits (e.g., ASICs, FPGAs, reduced instruction set processors, and the like), or some combination of these.

One or more memory devices 20 (e.g., memory devices 20A, 20B) may store the design software 14. In addition, the memory device(s) 20 may store information related to the integrated circuit device 12, such as control software, configuration software, look up tables, configuration data, etc. In some embodiments, the processor(s) 16 and/or the memory device(s) 20 may be external to the computing system 18. The memory device(s) 20 may include a tangible, non-transitory, machine-readable-medium, such as a volatile memory (e.g., a random-access memory (RAM)) and/or a nonvolatile memory (e.g., a read-only memory (ROM)). The memory device(s) 20 may store a variety of information that may be used for various purposes. For example, the memory device(s) 20 may store machine-readable and/or processor-executable instructions (e.g., firmware or software) for the processor(s) 16 to execute, such as instructions to determine a speed of the integrated circuit device 12 or a region of the integrated circuit device 12, determine a criticality of a path of a design programmed in the integrated circuit device 12 or a region of the integrated circuit device 12, programming the design in the integrated circuit device 12 or a region of the integrated circuit device 12, and the like. The memory device(s) 20 may include one or more storage devices (e.g., nonvolatile storage devices) that may include read-only memory (ROM), flash memory, a hard drive, or any other suitable optical, magnetic, or solid-state storage medium, or any combination thereof.

The design software 14 may use a compiler 22 (e.g., 22A, 22B) to generate a low-level circuit-design program 24 (bitstream) (e.g., program 24A, 24B), sometimes known as a program object file, which programs the integrated circuit device 12. That is, the compiler 22 may provide machine-readable instructions representative of the circuit design to the integrated circuit device 12. For example, the integrated circuit device 12 may receive one or more programs 24 as bitstreams that describe the hardware implementations that should be stored in the integrated circuit device 12. The programs 24 (bitstreams) may programmed into the integrated circuit device 12 as a program configuration 26 (e.g., program configuration 26A, program configuration 26B).

As illustrated, the system 10 also includes a cloud computing system 28 that may be communicatively coupled to the computing systems 18A and 18B, for example, via the internet or a network connection. The cloud computing system 28 may include processing circuitry 30 and one or more memory devices 32. The memory device(s) 32 may store information related to the integrated circuit device 12, such as control software, configuration software, look up tables, configuration data, etc. The memory device(s) 32 may include a tangible, non-transitory, machine-readable-medium, such as a volatile memory (e.g., a random-access memory (RAM)) and/or a nonvolatile memory (e.g., a read-only memory (ROM)). The memory device(s) 32 may store a variety of information that may be used for various purposes. For example, the memory device(s) 32 may store machine-readable and/or processor-executable instructions (e.g., firmware or software) for the processing circuitry 30 to execute. Additionally, the memory device(s) 32 of the cloud computing system 28 may include programs 24A and circuit designs previously made by designers and the computing systems 18A and 18B.

The integrated circuit devices 12A and 12B may include micro networks-on-chip (micro NOCs) 34 (collectively referring to micro NOC(s) 34A and micro NOC(s) 34B). For example, one or more micro NOCs may be dispersed in the integrated circuit device 12 to enable communication throughout the integrated circuit device 12. For example, as discussed below, the micro NOCs 34 may be implemented using hardened fabric resources on the integrated circuit device 12 between another NOC and other circuitry included on the integrated circuit device 12.

The memory device(s) 32 may also include one or more libraries of chip-specific predefined locations and fixed routes that may be utilized to generate a NOC or program a micro NOC. When a designer is utilizing the design software 14, the processor(s) 16 may request information regarding NOCs or micro NOCs previously designed by other designers or implemented on other integrated circuit device 12. For instance, a designer who is working on programming the integrated circuit device 12A may utilize the design software 14A and processor(s) 16A to request a design for a NOC or characteristics of a micro NOC used on another integrated circuit (e.g., integrated circuit device 12B) from the cloud computing system 28. The processing circuitry 30 may generate and/or retrieve a design of a NOC or characteristics of micro NOC from the memory devices(s) 32 and provide the design to the computing system 18A. Additionally, the cloud computing system 28 may provide information regarding the predefined locations and fixed routes for a NOC or micro NOC to the computing system 18A based on the specific integrated circuit device 12A (e.g., a particular chip). Furthermore, the memory device(s) 32 may keep records and/or store designs that are used to provide NOCs and micro NOCs with regularized structures, and the processing circuitry 30 may select specific NOCs or micro NOCs based on the integrated circuit device 12A as well as design considerations of the designer (e.g., amounts of data to be transferred, desired speed of data transmission).

Figure 2:
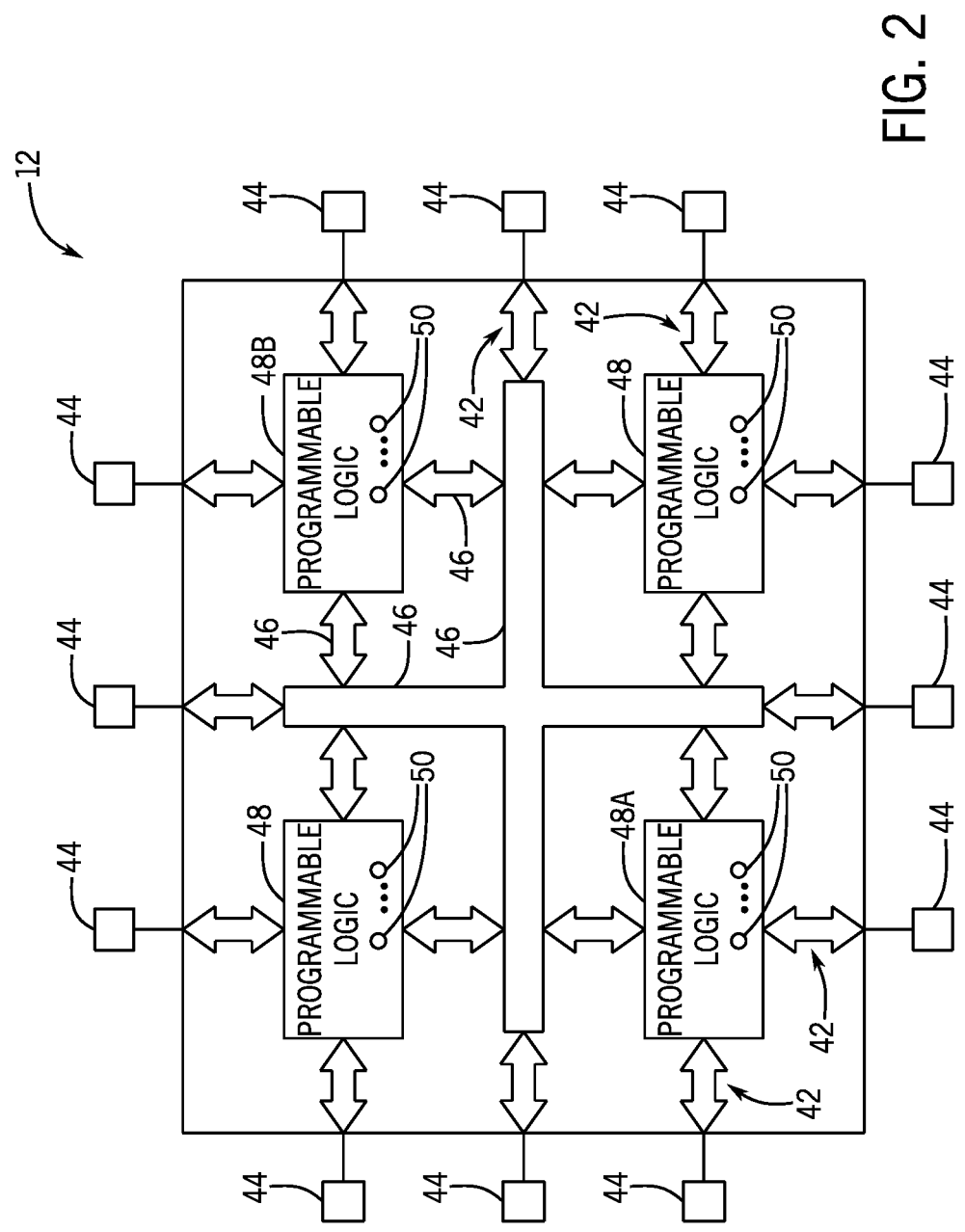
FIG. 2 is a block diagram of the integrated circuit device of FIG. 1, in accordance with an embodiment of the present disclosure.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of programmable logic device (e.g., an application-specific integrated circuit and/or application-specific standard product). As shown, integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as integrated circuit device 12, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Furthermore, it should be noted that the programmable logic 48 may correspond to different portions or sectors on the integrated circuit device 12. That is, the integrated circuit device 12 may be sectorized, meaning that programmable logic resources may be distributed through a number of discrete programmable logic sectors (e.g., each programmable logic 48). In some cases, sectors may be programmed to perform specific tasks. For example, a first sector (e.g., programmable logic 48A) may perform a first operation on data. The interconnect resources 46, which may include a NOC designed using the design software 14, may be utilized to provide the data to another sector (e.g., programmable logic 48B), which may perform further operations on the data.

Figure 3:
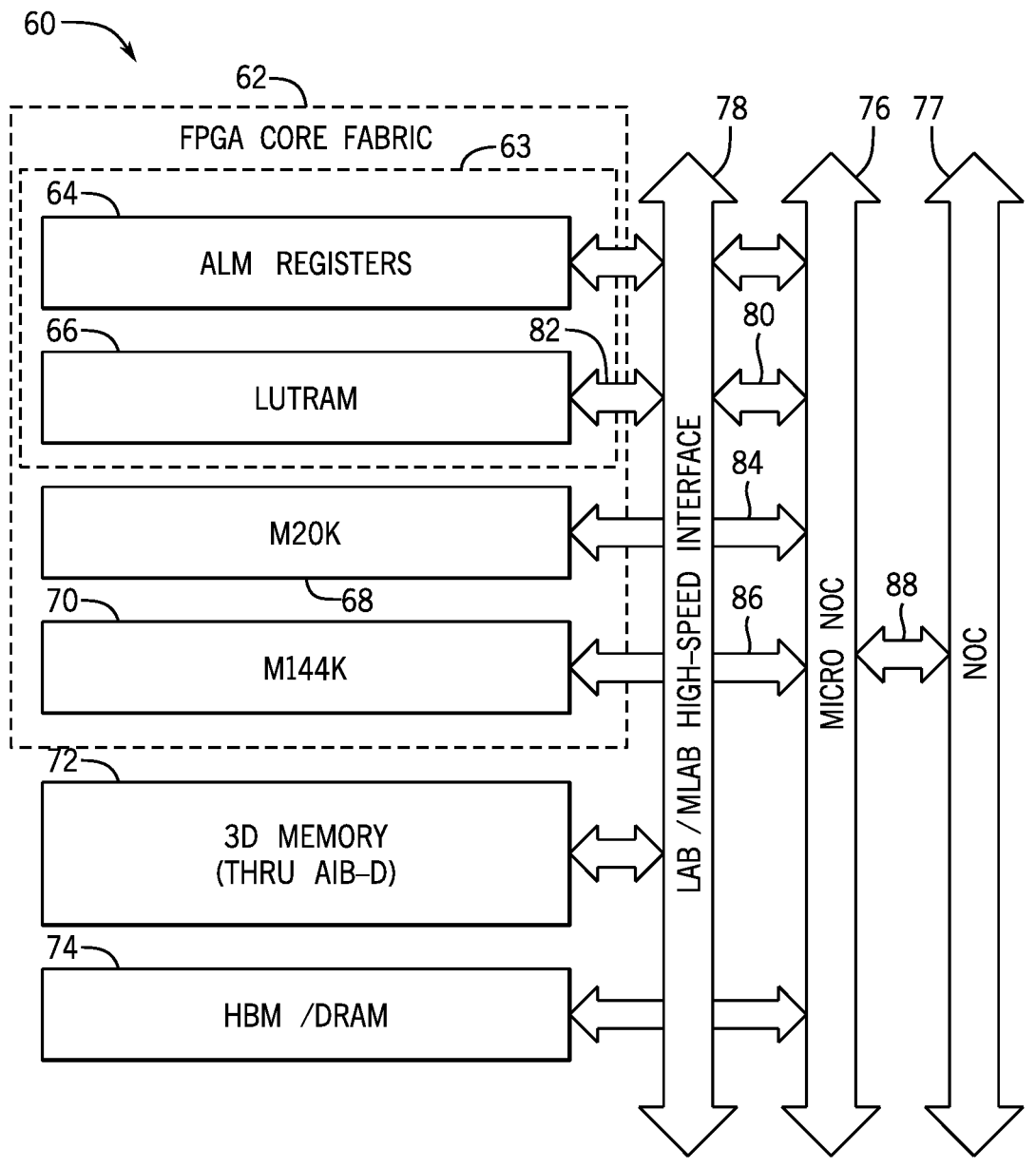
FIG. 3 is a block diagram of a portion of the integrated circuit device of FIG. 1, in accordance with an embodiment of the present disclosure.

Keeping the foregoing in mind, FIG. 3 illustrates a diagram 60 of portions of the integrated circuit device 12. For example, the diagram 60 includes an core fabric 62. The core fabric 62 may include soft logic of the integrated circuit device 12, including, but not limited to, programmable logic 48. Furthermore, it should be noted that the core fabric 62 may be discussed herein as being included in an FPGA, the core fabric 62 may be included in other types of integrated circuit devices including programmable logic devices. The core fabric 62 may include additional elements such as LABs and MLABs. The LABs and MLABs may include ALMs 63 that include ALM registers 64 and LUTRAM 66. The ALM registers 64 and the LUTRAM 66 may be configured to perform a number of operations of the integrated circuit device 12. Additionally, in some embodiments, the core fabric 62 may include memory blocks, such as M20k 68 and M144k 70. The memory blocks may be dispersed throughout the core fabric 62. There may be other types of memory in the integrated circuit device 12 as well, such as 3D memory 72 and high bandwidth memory/dynamic random-access memory (HBM/DRAM) 74. Further, in some embodiments, one or more micro NOCs 76 may be directly connected to the ALM registers 64 and the LUTRAM 66 via hardened paths to provide rapid communication between the circuitries. By using the hardened paths, for instance, as opposed to paths formed in soft logic or using programmable resources, data may be transferred relatively more quickly and with higher bandwidths.

One or more micro NOCs 76 may include hardened communication circuitry connected to shoreline NOCs of the integrated circuit device 12. For example, shoreline NOCs 77 may be located on exterior shorelines of the integrated circuit device 12 to provide connections to other portions of the integrated circuit device 12, such as internal memory circuitry and external devices, such as external memory. The micro NOCs 76 may provide deep connectivity from the shoreline NOCs 77 to ALMs 63 and other circuitry within the core fabric 62 and within the integrated circuit device 12 in general. For example, the micro NOCs 76 may connect to the shoreline NOCs 77 via connections 88. In some embodiments, the hardened connections in the micro NOC 76 may be faster than soft logic paths, which may use synthesizing, placing, and routing techniques to generate soft logic communication paths between the shoreline NOCs 77 and the ALMs 63. Further, because the communication is transferred via hardened circuitry, meaning routing through programmable logic is reduced or eliminated, compiling may be completed more quickly (e.g., because relatively less routing or no routing through programmable logic would be determined).

Further, a high-speed interface 78 may connect the micro NOCs 76 to the core fabric 62 (e.g., the ALM registers 64 and the LUTRAM 66) via connections 80 and 82. Further, the micro NOCs 76 may connect to the M20k 68 and M144k 70 via a connection 84 and a connection 86, respectively. In some embodiments, the micro NOCs 76 may be hardened to the M20Ks 68 to provide deep connections into the integrated circuit device 12.

Figure 4:
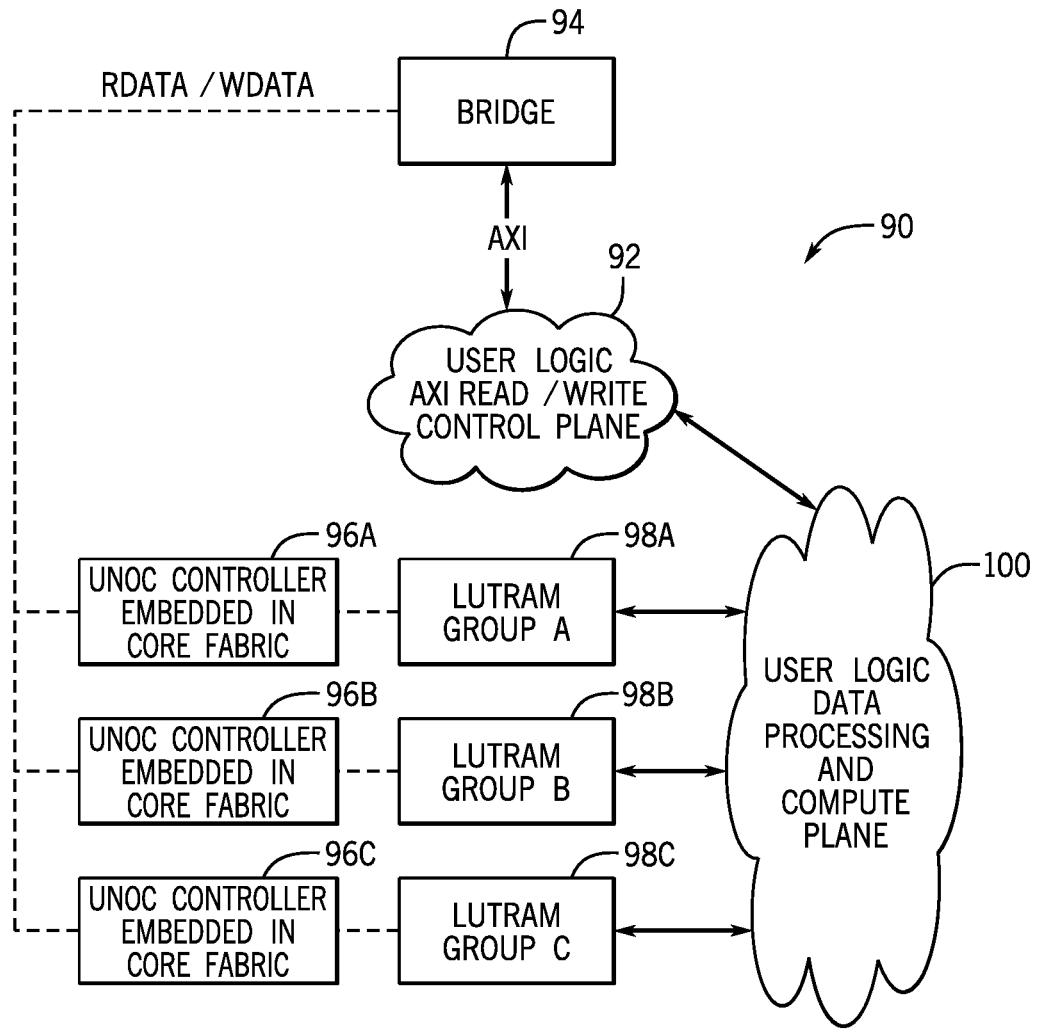
FIG. 4 is a block diagram of another portion of the integrated circuit device of FIG. 1, in accordance with an embodiment of the present disclosure.

Turning now to a more detailed discussion of the communications enabled by the micro NOCs 76, FIG. 4 illustrates a diagram 90 of another portion the integrated circuit device 12. The diagram 90 illustrates a method of grouping together multiple groups of LUTRAM 66 (e.g., LUTRAM groups (98A, 98B, 98C). For example, in some embodiments, user logic 92 may extensible interface (AXI) protocol. However, in some embodiments, other protocols or interfaces may be used, such as the Avalon® memory-mapped (AVMM) interfaces using an AVMM protocol. In some embodiments, the groupings of the LUTRAM 66 may be assigned during a design stage by a designer using the design software 14. Once grouped, the connection of groups of LUTRAM 66 to the micro NOC 76 may be described as groups with AxUSER bindings. For example, when an AXI read/write uses a specified ARUSER/AWUSER, the AXI read/write may be directed to the specified group of LUTRAM 66. Indeed, there may be a micro NOC controller 96 (e.g., controllers 96A, 96B, 96C) dedicated for each of the groups. For example, the illustrated diagram 90 shows an example embodiment in which three micro NOC controllers 96 (referring collectively to controllers 96A, 96B, 96C) are dedicated to the groups of LUTRAM 66: controller 96A, controller 96B, and controller 96C.

The illustrated diagram 90 shows an example embodiment in which three groups 98 of LUTRAM 66 have been identified: group 98A, group 98B, and group 98C. When the user logic 92 specifies an ARUSER for a read or a write signal, for example via a bridge 94, the controllers 96A, 96B, and 96C may direct the read or write signal to the group 98 specified, (e.g., one or more of the groups 98A, 98B, and 98C). In some embodiments, each of the controllers 96 may direct the signals to a respective group 98 (e.g., one of groups 98A, 98B, 98C). Further, the group specified may then interact with a user logic data processing and compute plane 100, for example, to complete a requested read or write operation. Additionally, while three groups 98 are shown in FIG. 4, in other embodiments, fewer or more groups 98 (and controllers 96) may be utilized.

Figure 5:
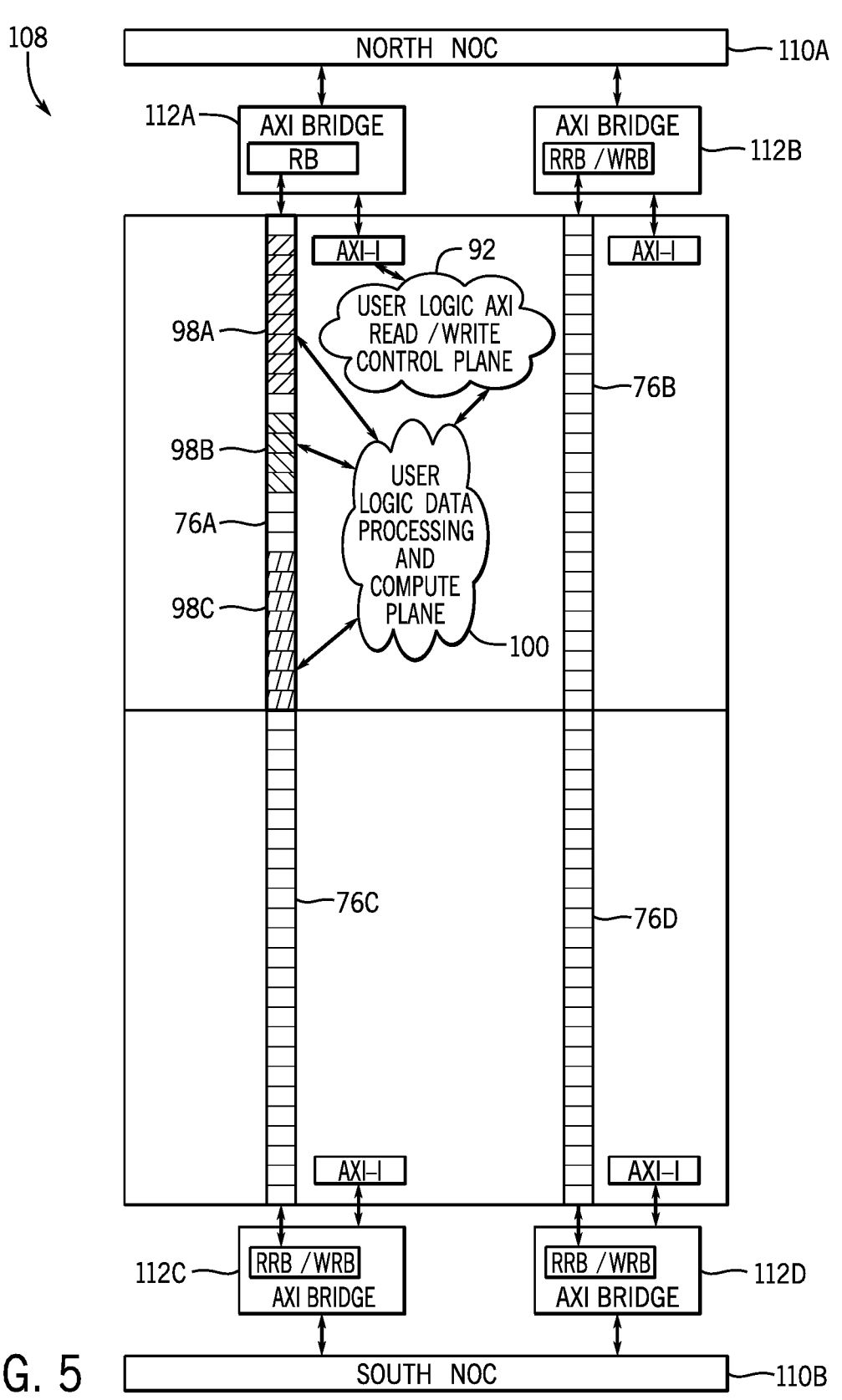
FIG. 5 is a block diagram of yet another portion of the integrated circuit device of FIG. 1, in accordance with an embodiment of the present disclosure.

Turning now to FIG. 5, a block diagram 108 illustrates a mapping of the groups 98A, 98B, and 98C to a micro NOC 76A, which may be one of multiple micro NOCs 76 (e.g., micro NOCs 76A, 76B, 76C, and 76D) within the integrated circuit device, such as. Further, the block diagram 108 illustrates an example embodiment of the integrated circuit device 12 including a north NOC 110A, a south NOC 110B, which may be (hardened) shoreline NOCs included in the integrated circuit device 12. Further, the micro NOCs 76A-D may be dispersed in programmable fabric of the integrated circuit device 12. As illustrated, an AXI interface 112A may communicatively couple the north NOC 110A to the micro NOC 76A, an AXI interface 112B may communicatively couple the north NOC 110A to the micro NOC 76B, an AXI interface 112C may communicatively couple the south NOC 110B to the micro NOC 76C, and an AXI interface 112D may communicatively couple the south NOC 110B to the micro NOC 76D. AXI interfaces 112 (referring collectively to AXI interfaces 112A, 112B, 112C, 112D) may include response buffers (labelled as "RB") which may be used to intercept and route data that is to be routed between NOCs 110 (referring to one of the shoreline NOCs 110A, 110B depending on which particular AXI interface 112 is referenced) and micro NOCs 76. The response buffers may include or function as read response buffers (RRBs), write response buffers (WRBs) or both.

In some embodiments, the micro NOCs 76 (referring collectively to micro NOCs 76A, 76B, 76C, 76D, or any combination thereof) may map to a number of LUTRAMs 66. Additionally or alternatively, the micro NOCs 76 may map to a number of groups of LUTRAMs 66, such as groups 98A, 98B, and 98C. Indeed, in the illustrated example, the micro NOC 76A is mapped to the groups 98A, 98B, and 98C. In some embodiments, other micro NOCs 76A-D may also be mapped to additional LUTRAM 66 or groups 98 of LUTRAM 66. As noted above, the design software 14 may statically map the groups 98 (referring to groups 98A, 98B, 98C, or any combination thereof). Further, as illustrated, the groups 98 may be communicatively coupled to the user logic data processing and compute plane 100.

Figure 6:
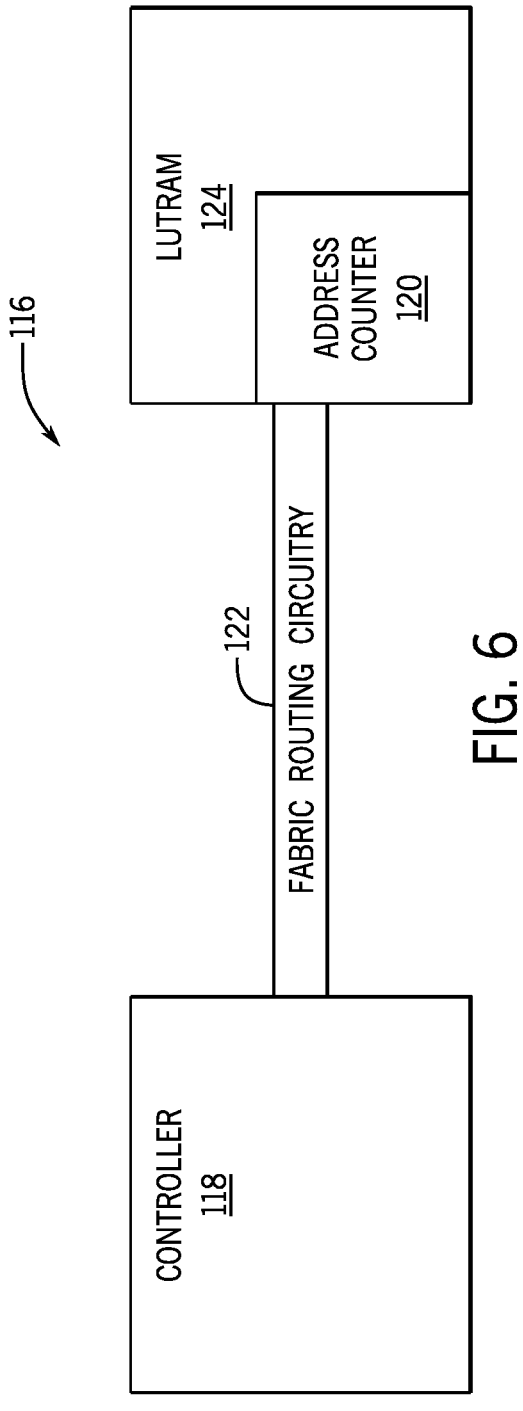
FIG. 6 is a block diagram of circuitry of the integrated circuit device of FIG. 1, in accordance with an embodiment of the present disclosure.

Turning now to FIG. 6, a diagram 116 of another portion of the integrated circuit 12 illustrates features of a controller 118 of the micro NOC 76. For example, in some embodiments, the controller 118 may be a shared controller between one of the M20Ks 68 and the micro NOC 76. Indeed, while the controller 118 may direct a fabric read, the micro NOC 76 may use portions of the controller 118 to perform write operations, for example, to the LUTRAM 124 (which may be the LUTRAM 66). Additionally or alternatively, while the controller 118 may direct a fabric write, the micro NOC 76 may use portions of the controller 118 to perform read operations from a LUTRAM 124. It should be noted that in embodiments in which a fabric read/write operation occurs at the same time as a micro NOC 76 write/read operation, soft logic may be used to ensure that clock domain crossings between ALM registers 64 and soft logic remain accurate. Further, in some embodiments, the controller 118 may include an indicator, such as a CRAM bit, that may differentiate whether the controller 118 is to operate under normal M20K 68 operations or whether the controller is to operate under micro NOC 76 operations. In other words, the indicator may be used to select which clock mode will be utilized.

The LUTRAM 124 may further include an address counter 120 to determine whether the LUTRAM 124 should operate in a user mode or in a micro NOC mode. Additionally, the address counter 120 may direct read/write instructions to an intended location. For example, in some embodiments, the address counter 120 may generate read/write addresses for the LUTRAM 124. The fabric routing circuitry 122 may include any number of circuits such as LUTs, multiplexers, counters, logical gates, flip flops, adders, subtractors, decoders, etc. to route instructions to their intended locations. For example, in some embodiments, the instructions may be sent to a logical element input mux (LEIM) of one of the ALMs 63. It should be noted that although the fabric routing circuitry 122 is shown outside of the controller 118, in some embodiments, the controller 118 may also include circuitry for routing the instructions towards their intended location.

Figure 7:
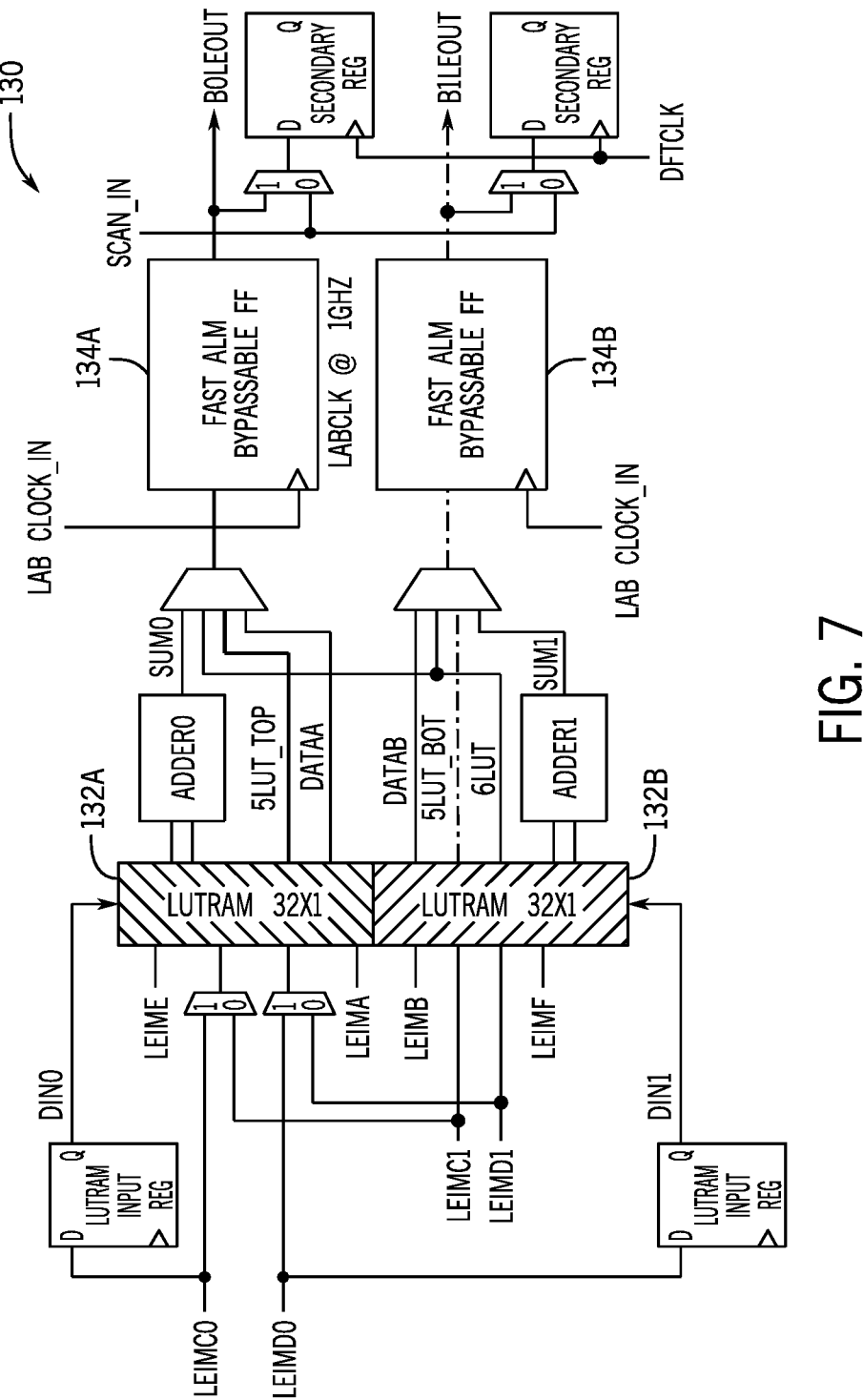
FIG. 7 is a schematic diagram of a LUTRAM read path of the integrated circuit device of FIG. 1, in accordance with an embodiment of the present disclosure.

Continuing with the drawings, FIG. 7 is a diagram of an ALM 130, which may be one of the ALMs 63. The ALM 130 may include LUTRAM 132A and 132B, which may be the LUTRAM 66. The ALM 130 may also include ALM registers 134A and 134B, which may be the ALM registers 64. The ALM 130 may also include additional circuitry, such as shadow registers, adders, multiplexers, etc. In some embodiments, the LUTRAM 132A and 132B may be configured to send read-out data through circuitry of the ALM 130 to the ALM registers 134A and 134B, respectively. The ALM registers 134A and 134B may then route the read-out data for the controller 118 to read.

In some embodiments, the read-out instructions may be routed from the controller 118 as described in FIG. 6. For example, the fabric routing circuitry 122 may route the read-out instructions to a LEIM of the ALM 63. The LEIM may then input the instructions to the LUTRAM 132A and 132B to instruct the LUTRAM 132A and 132B which data to read out.

Figure 8:
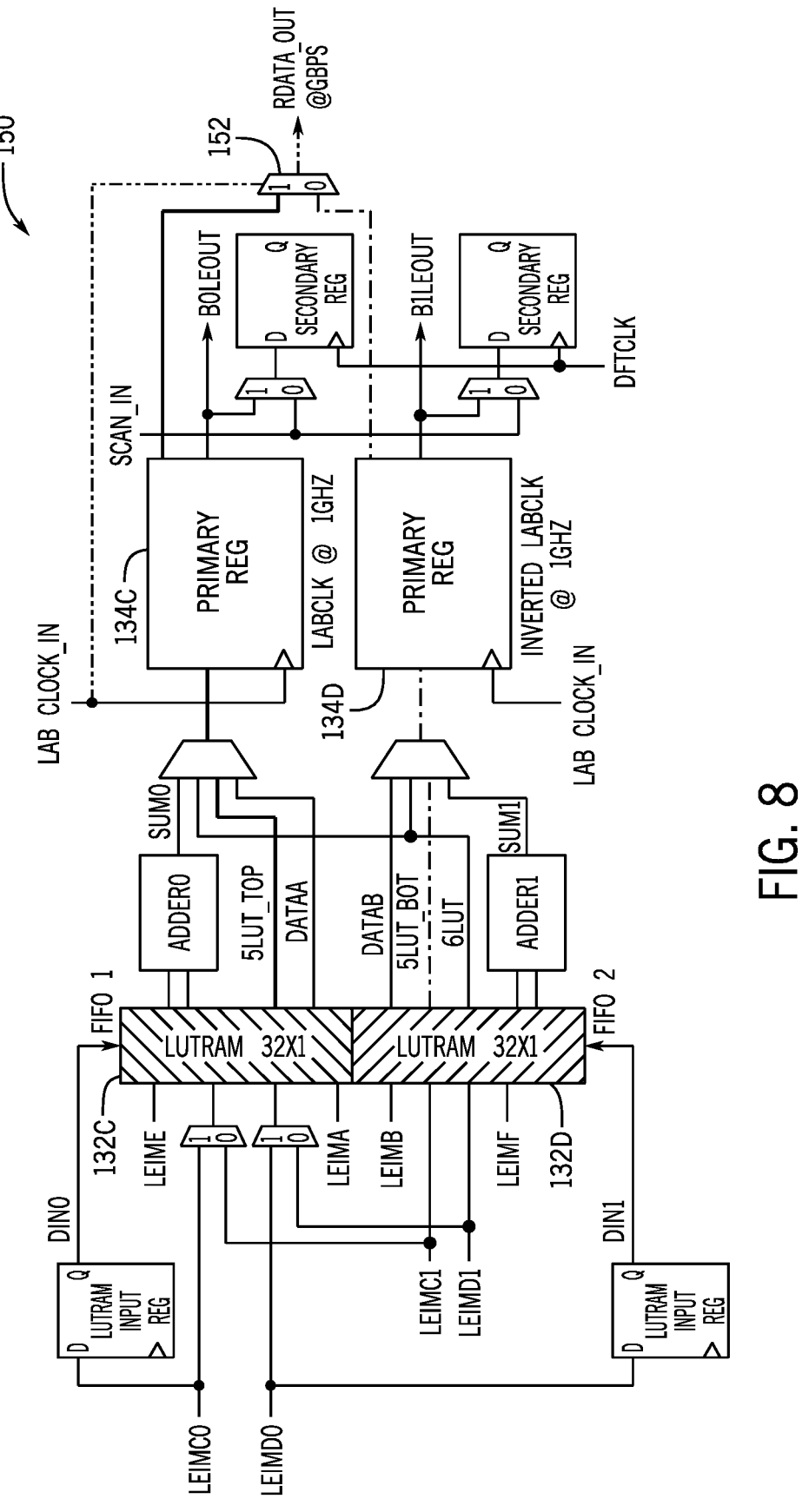
FIG. 8 is a schematic diagram of a LUTRAM read path of the integrated circuit device of FIG. 1, in accordance with an embodiment of the present disclosure.

Keeping the foregoing in mind, FIG. 8 illustrates an example embodiment of a FIFO read (e.g., 32-bit deep FIFO read) from the ALM 63. Indeed, a diagram 150 shows an illustrated example of one of the ALMs 63 including LUTRAM 132C and 132D and ALM registers 134C and 134D. The ALM 63 may further include a multiplexer 152 configured to receive a clock signal and outputs from the ALM registers 134C and 134D. In some embodiments, the multiplexer 152 may provide double data rate (DDR) clocking capacities to the ALM 63. For example, in some embodiments, the LUTRAM 132C may output read-out data to the ALM register 134C at a rate of 1 gigabits per second (Gbps). The ALM register 134C may then route the read-out data to the multiplexer 152 at 1 Gbps. Further, the LUTRAM 132D may output read-out data to the ALM register 134D at a rate of 1 Gbps. The ALM register 134D may then route the read-out data to the multiplexer 152 at 1 Gbps. The clock signal sent to the multiplexer 152 may instruct the multiplexer 152 to output the two signals from the ALM registers 134C and 134D at a rate of 2 Gbps. It should be noted that the frequencies described are intended to be illustrative only, and that any appropriate speed may be used. For example, in some embodiments, the LUTRAM 132C and 132D may output read-out data at 500 megabits per second (Mbps), 1500 Mbps, or any other appropriate speed.

Figure 9A:
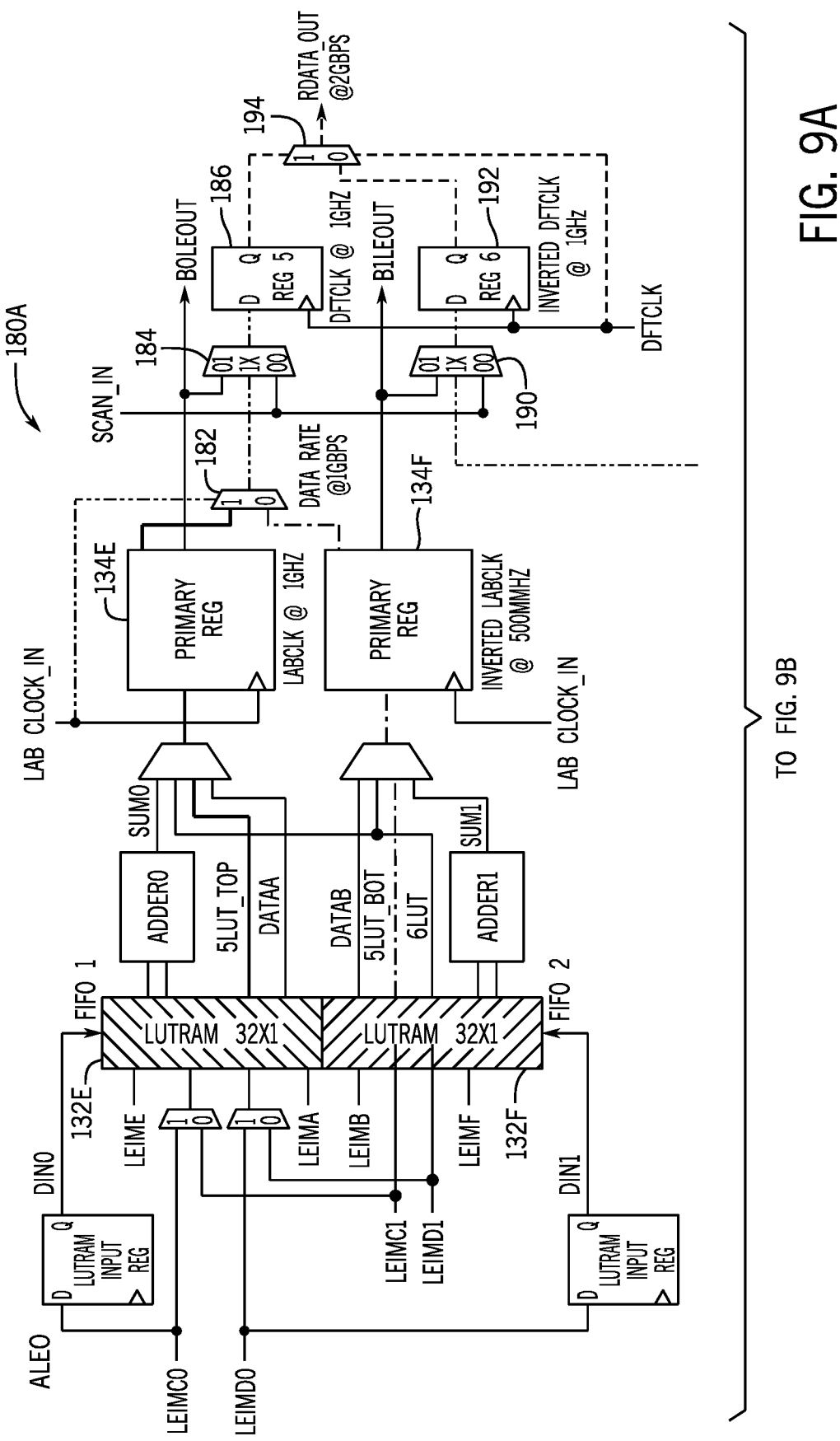
FIG. 9A is a schematic diagram of a LUTRAM read path of the integrated circuit device of FIG. 1, in accordance with an embodiment of the present disclosure.
Figure 9B:
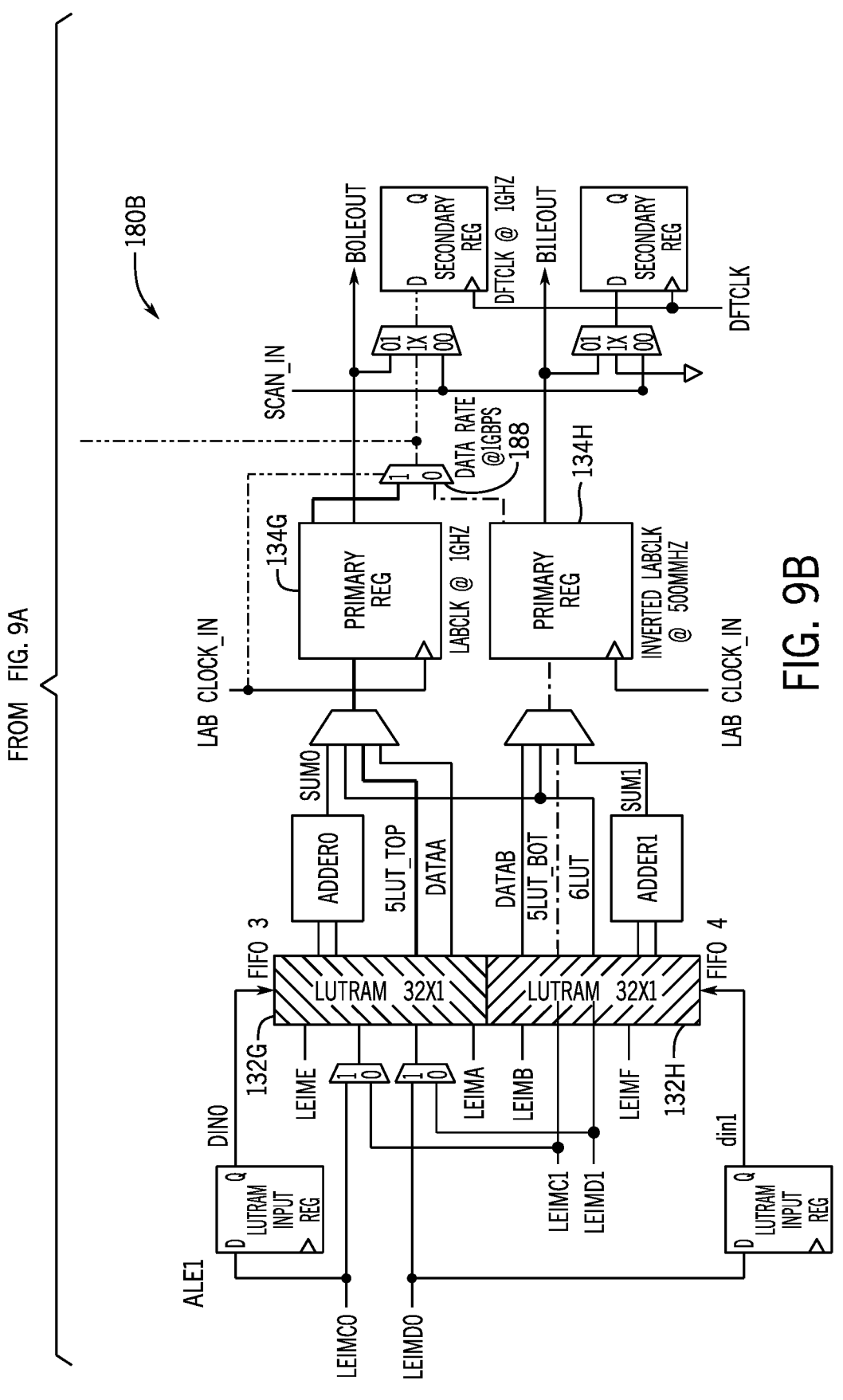
FIG. 9B is a schematic diagram of a LUTRAM read path of the integrated circuit device of FIG. 1, in accordance with an embodiment of the present disclosure.

Keeping the foregoing in mind, FIGS. 9A and 9B illustrate an example embodiment of a FIFO read (e.g., 32-bit deep FIFO read) from two of the ALMs 63 (e.g., ALMs 180A, 180B). Indeed, in the FIG. 9A, a first ALM 180A includes LUTRAM 132E, 132F and ALM registers 134E, 134F. The first ALM 180A may further include a multiplexer 182 configured to receive a clock signal and outputs from the ALM registers 134E,134F. In some embodiments, the multiplexer 182 may provide double data rate (DDR) clocking capacities to the first ALM 63. For example, in some embodiments, the ALM registers 134E and 134F may output read-out data at a rate of 500 Mbps. The clock signal sent to the multiplexer 182 may instruct the multiplexer 182 to output the two signals from the ALM registers 134E, 134F at a rate of 1 Gbps. The multiplexer 182 may output the read-out data signals to a multiplexer 184, which may route the read-out data to a shadow register 186.

Further, FIG. 9B illustrates the second ALM 180B, which may include LUTRAM 132G, 132H and ALM registers 134G, 134H. The second ALM 63 may further include a multiplexer 188 configured to receive a clock signal and outputs from the ALM registers 134G, 134H. In some embodiments, the multiplexer 188 may provide double data rate clocking capacities to the second ALM 63. For example, in some embodiments, the ALM registers 134G and 134H may output read-out data at a rate of 500 Mbps. The clock signal sent to the multiplexer 188 may instruct the multiplexer 188 to output the two signals from the ALM registers 134G and 134H at a rate of 1 Gbps. The multiplexer 188 may output the read-out data signals to a multiplexer 190 of the first ALM 180A, which may route the read-out data to a shadow register 192.

The shadow registers 186 and 192 may be configured to output the read-out data to a multiplexer 194 of the first ALM 180A, which may further receive a clock signal to double the rate of operations. Accordingly, the multiplexer 194 may output the data at a rate of 2 Gbps. Accordingly, FIGS. 9A and 9B shows how the data transfer rate of the LUTRAM 132E-H may be quadrupled (e.g., from 500 Mbps to 2 Gbps) or, in other words, operate at a quadruple data rate (QDR) for a read operation. This may allow for a smaller output bus to be used, with two of the ALMs 63 (e.g., ALMs 180A, 180B) sharing a single output data signal path. Additionally, it should be noted that the frequencies described are intended to be illustrative only and that any appropriate speed may be used. For example, in some embodiments, the LUTRAM 132E-H may output read-out data at 250 Mbps, 1000 Mbps, or any other appropriate speed.

Figure 10:
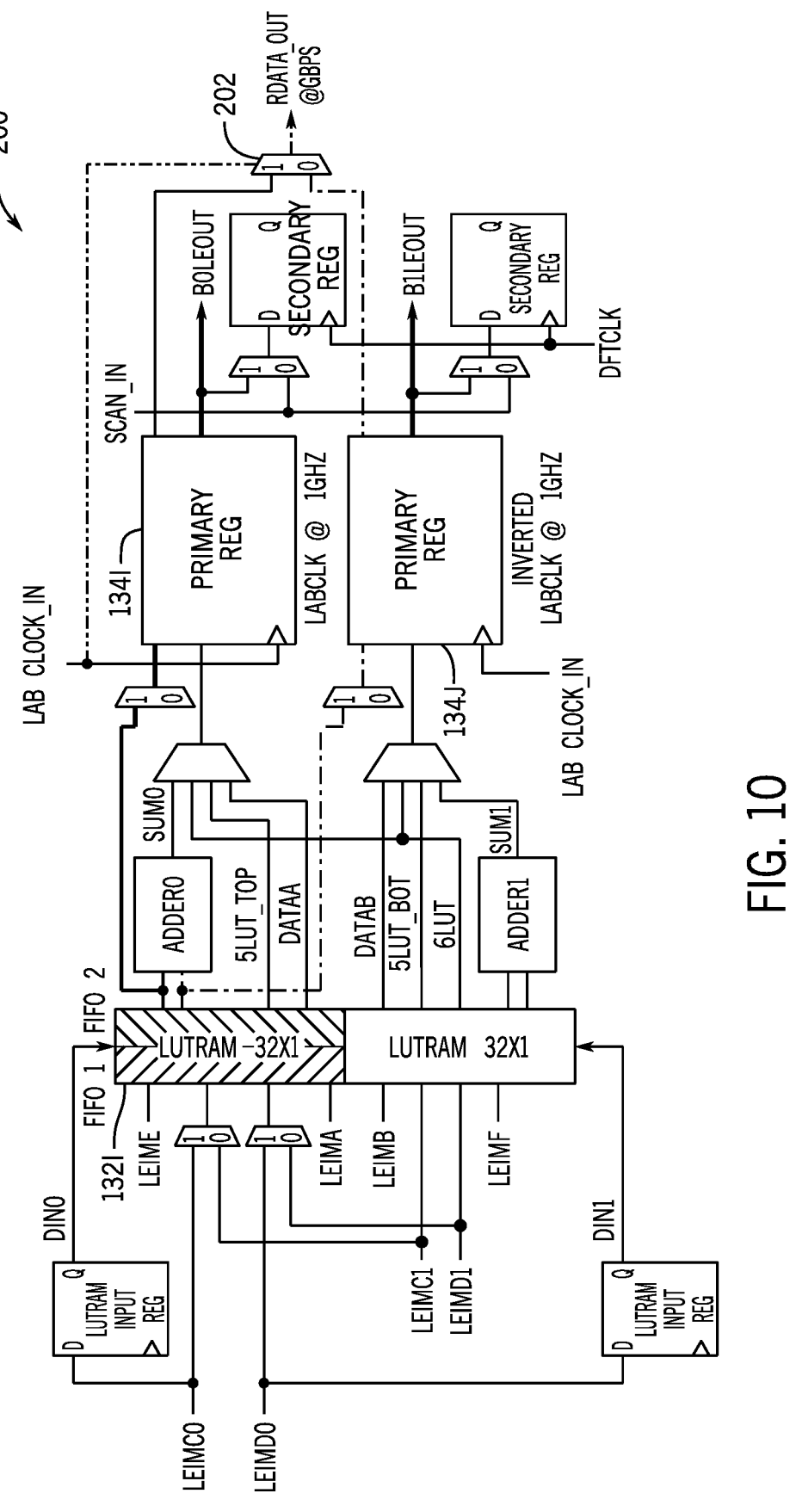
FIG. 10 is a schematic diagram of a LUTRAM read path of the integrated circuit device of FIG. 1, in accordance with an embodiment of the present disclosure.

Keeping the forgoing in mind, FIG. 10 illustrates an ALM 200, which may be an ALM 63. In some embodiments, a single LUTRAM 1321 may be used in DDR data transfers. Other LUTRAM on the ALM 200 may be power gated while not in use, for example to save power consumption. The LUTRAM 1321 may split its read-out data into two signals, one of which may be routed to an ALM register 1341 and the other to an ALM register 134J. A multiplexer 202 may receive the outputs of the ALM registers 1341 and 134J, as well as a clock signal, to output the read-out data. The DDR methods described earlier may also be employed here, so that the multiplexer 202 may output the read-out data twice as fast as the LUTRAM 1321. For example, the LUTRAM 1321 may output the first signal at 1 Gbps and the second signal at 1 Gbps, and the multiplexer 202 may output the read-out data at 2 Gbps. As described above, other speeds may be used.

Figure 11:
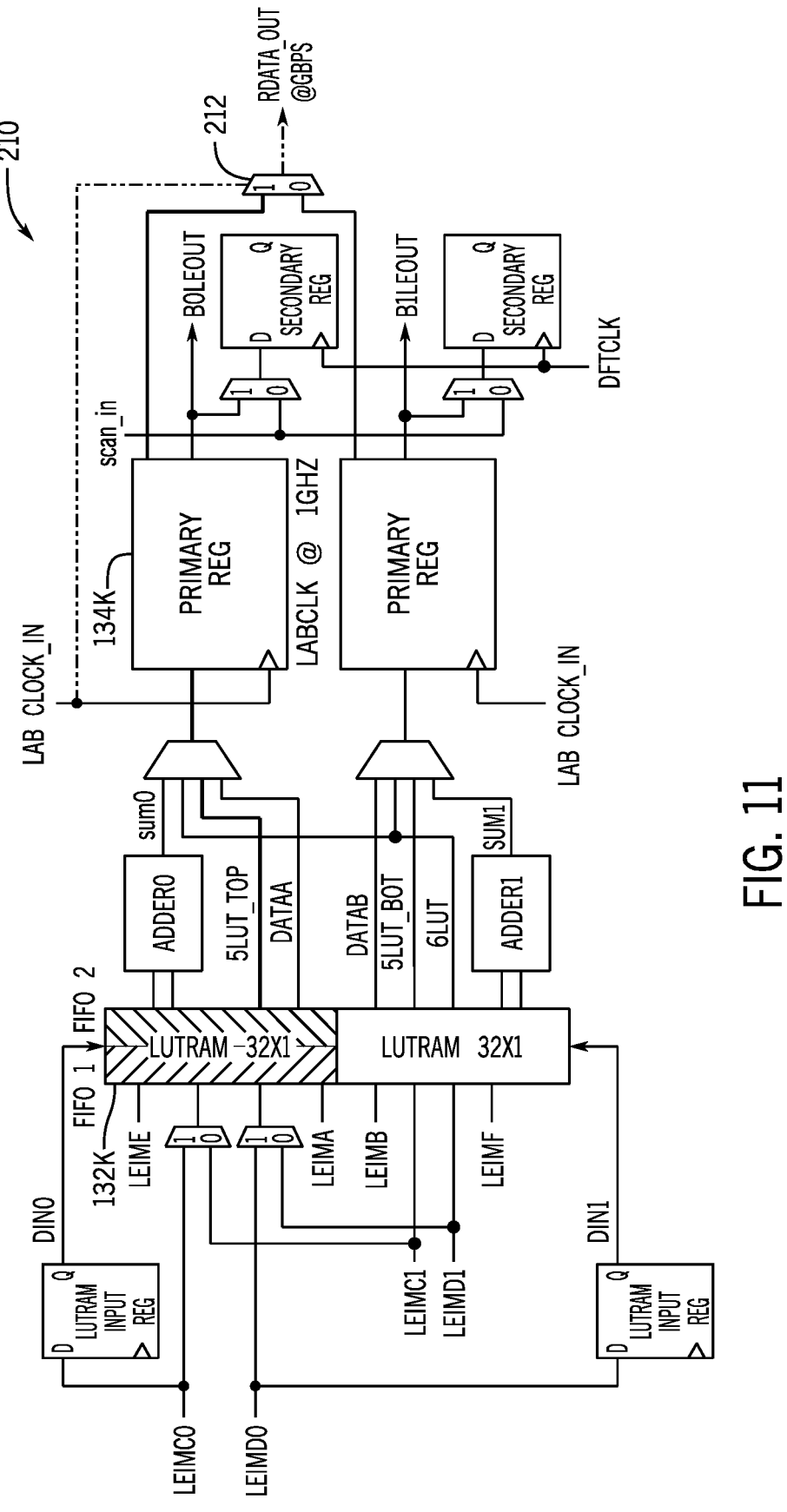
FIG. 11 is a schematic diagram of a LUTRAM read path of the integrated circuit device of FIG. 1, in accordance with an embodiment of the present disclosure.

Continuing with the drawings, FIG. 11 illustrates an example of single data rate (SDR) transfer in an ALM 210, which may be an ALM 63. As illustrated, the ALM 210 includes a single LUTRAM 132K and a single ALM register 134K that are utilized when performing an SDR data transfer. In some embodiments, other LUTRAM 66 or ALM registers 64 may be power gated, as explained previously. The LUTRAM 132K may output a single read-out data signal, which may be routed to the ALM register 134K. The ALM register 134K may output the read-out data signal to a multiplexer 212, which may then output the data to an output signal for the controller 118 to read. In some embodiments, the data rate may stay stable throughout the ALM 210. For example, if the LUTRAM 132K outputs a signal at 1 Gbps, then the data output to the controller 118 by the multiplexer 212 may also be at a speed of 1 Gbps.

Figure 12:
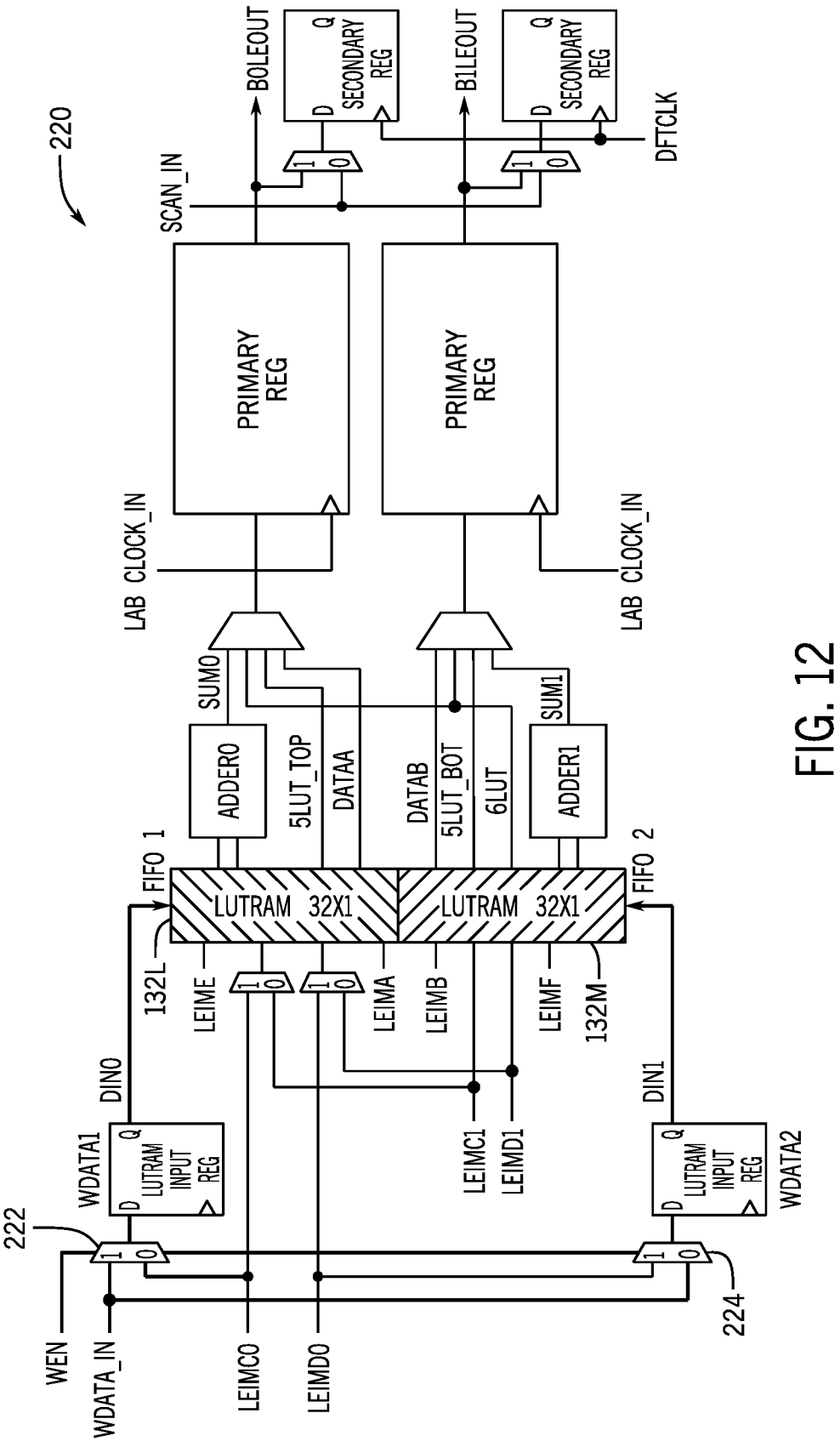
FIG. 12 is a schematic diagram of a LUTRAM write path of the integrated circuit device of FIG. 1, in accordance with an embodiment of the present disclosure.

FIG. 12 illustrates an example of a write operation to a LUTRAM 66 of an ALM 220, which may be an ALM 63. For example, in some embodiments, the ALM 63 may include LUTRAM 132L and 132M, as well as multiplexers 222, 224. The multiplexer 222 may receive a write_enable signal and a wdata_in signal. The write_enable signal may come from the controller 118 via the fabric routing circuitry 122 and may indicate to the multiplexer 222 whether the wdata_in data should be written to the LUTRAM 132L. The wdata_in signal may also originate from the controller 118 via similar means and may be written to the LUTRAM 132L. Further, the multiplexer 224 may receive the write_enable signal and the wdata_in signal and may write the wdata_in data to the LUTRAM 132M based on the signals in a similar fashion. It should be noted that the write_enable signal may be mutually exclusive to a read_enable signal, which may be used in read operations.

Figure 13:
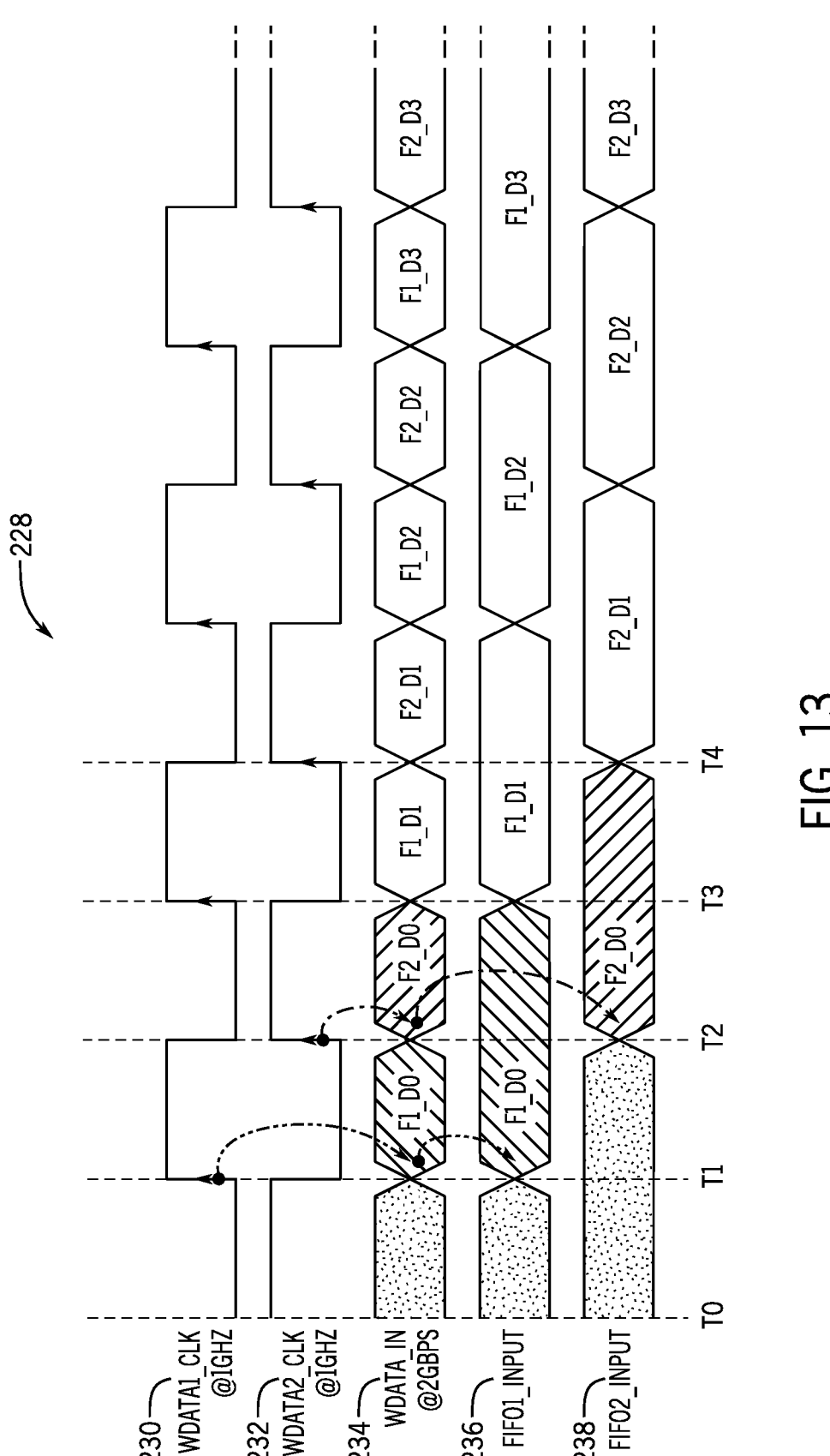
FIG. 13 is a timing diagram of the integrated circuit device of FIG. 1, in accordance with an embodiment of the present disclosure.

Keeping the foregoing in mind, FIG. 13 illustrates a timing diagram 228 of write operations of the integrated circuit device 12. For example, in some embodiments, two clock signals may be used to allow for DDR write operations. For example, a first clock signal 230 may operate at a frequency (e.g., 1 GHZ). Further, a second clock signal 232 may also operate at the same frequency. However, the second clock signal 232 may be an inverted version of the first clock signal 230. For example, the second clock signal 232 may have a falling edge at a time the first clock signal 230 has a rising edge. A wdata_in signal 234 may indicate data to be written (e.g., first data, second data, third data, etc.) and may have at a rate of 2 Gbps. A FIFO input signal 236 may indicate when data (e.g., from the wdata_in 234) is written to a LUTRAM 66. A second FIFO input signal 238 may indicate when data (e.g., from the wdata_in 234) is written to a second LUTRAM 66.

The timing diagram 228 shows how DDR operations may be performed via the two clock signals 230 and 232. At a time t0 the first clock signal 230 may be low and the second clock signal 232 may be high. At a time t1, the first clock signal 230 may rise and the second clock signal 232 may fall. In response to the rising signal of the first clock signal 230, the data in the wdata_in signal 234 may be written to the first LUTRAM 66, as indicated by the FIFO input signal 236. At a time t2, the first clock signal may fall and the second clock signal 232 may rise. The data in the wdata_in signal 234 may switch from first data to second data with the rising of the second clock signal 232. The second data from the wdata_in signal 234 may be written to the second LUTRAM 66, as indicated by the second FIFO input signal 238. However, the first data from the wdata_in signal 234 may continue to be written to the first LUTRAM 66 concurrently until a time t3. At the time t3, the first clock signal 230 may rise and the second clock signal 232 may fall. Accordingly, the wdata_in signal 234 may complete transmitting the second data. At the time t3 the first LUTRAM 66 may complete receiving the first data, and the second LUTRAM 66 may continue receiving the second data until a time t4. It should be noted that the frequencies and types of data sent are intended to be illustrative only, and that many DDR operations may be possible with the configuration illustrated in the timing diagram 228.

Figure 14:
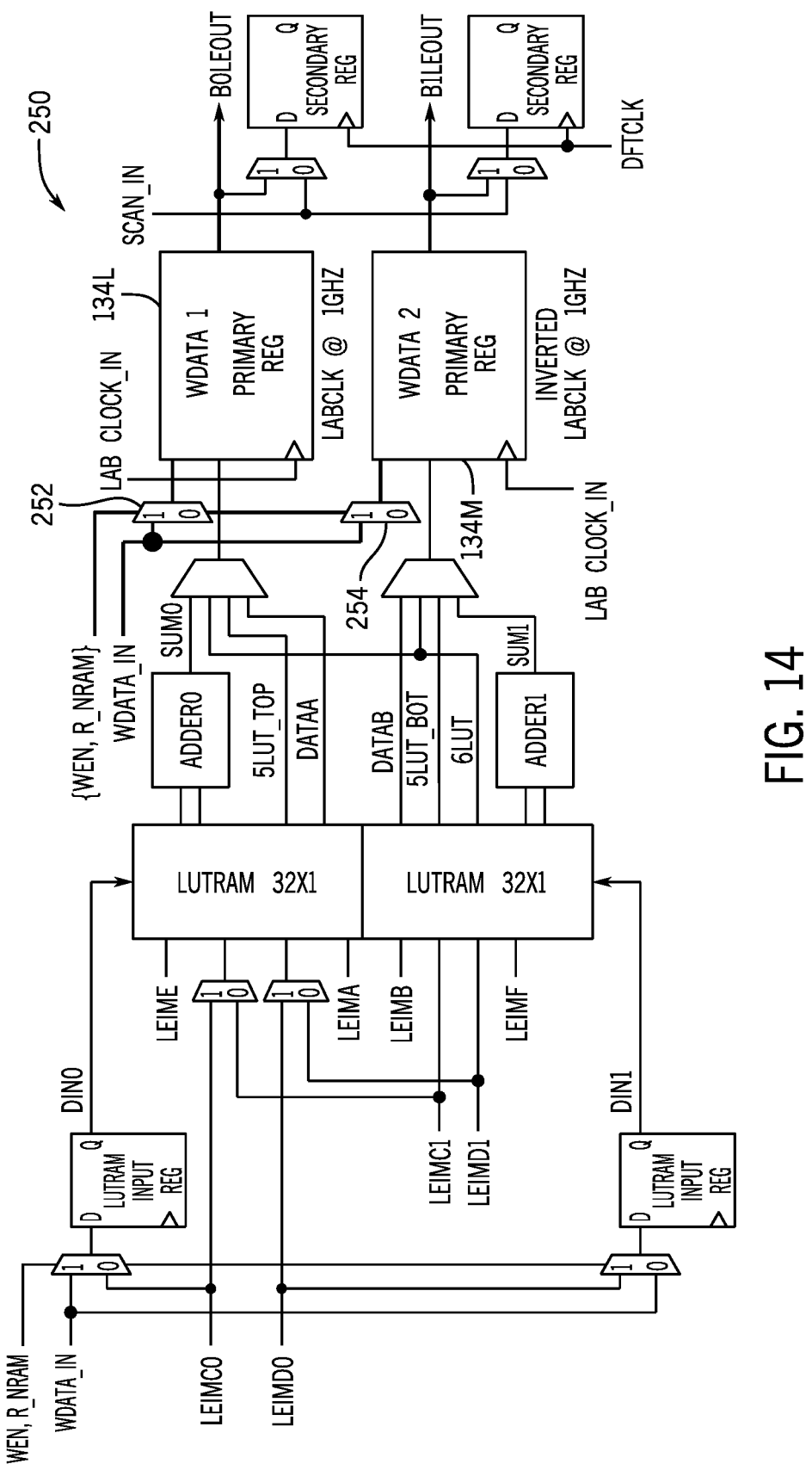
FIG. 14 is a schematic diagram of an ALM write path of the integrated circuit device of FIG. 1, in accordance with an embodiment of the present disclosure.

Keeping the foregoing in mind, FIG. 14 illustrates an example of a write operation in an ALM 250, which may be an ALM 63. Indeed, the ALM 250 (or any other embodiment of the ALM 63) may be configurable to write to ALM registers 64 of the ALM 250, in addition to LUTRAM 66. As illustrated, the ALM 250 may include ALM register 134L and 134M. The ALM registers 134L and 134M may receive input data from multiplexers 252, 254, respectively. The multiplexers 252 and 254 may receive write enable and r_nram signals to determine operations of the ALM 250. For example, the write enable and r_nram signals may determine that wdata_in (which may also be input to the multiplexers 252,254) should be written to the LUTRAM 66 of the ALM 63 or to the ALM registers 134L and 134M. For example, the write enable and r_nram signals may indicate that the wdata_in data should be written to the ALM registers 134L and 134M, as shown in the ALM 250. Additionally or alternatively, the write enable and r_nram signals may indicate that the wdata_in data should be written to the LUTRAM 66 of the ALM 250, as described above with respect to FIG. 12.

Figure 15:
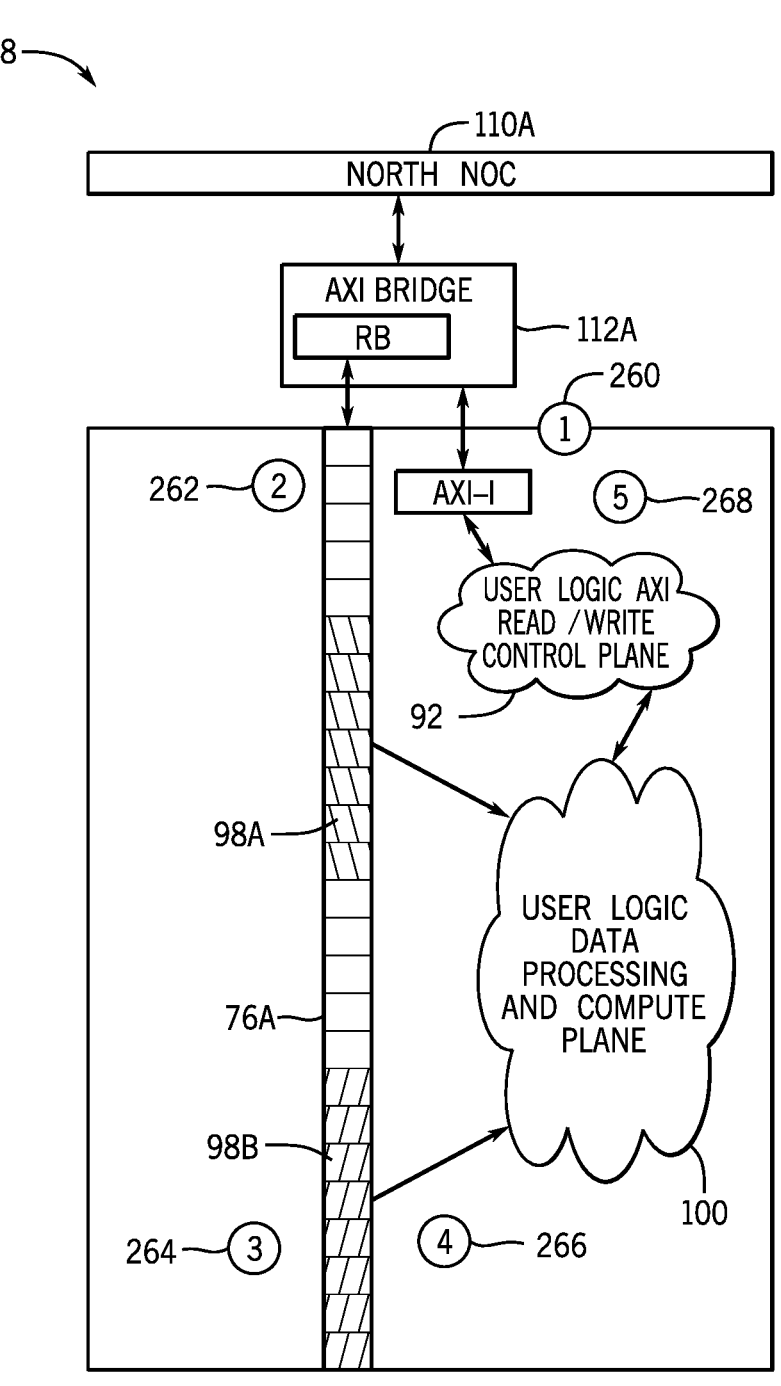
FIG. 15 is a diagram of streaming operations of the integrated circuit device of FIG. 1, in accordance with an embodiment of the present disclosure.

Turning now to FIG. 15, a block diagram 258 illustrates several operations that may occur in an example embodiment of the integrated circuit device 12. The operations are intended to describe an example flow of operations to accomplish a read operation from one of the ALMs 63 via the micro NOC 76A.

In a first operation 260, a read command may be sent by the user logic 92, which may specify a group of LUTRAM 66 to write into, such as the group 98A, which may be communicatively coupled to the user logic data processing and compute plane 100. In some embodiments, the read command may be routed to the micro NOC 76A via the controller 118, which may be the controller 96A as described in FIG. 4. In a second operation 262, an R channel (e.g., when using the AXI protocol), or other channel of another appropriate protocol, may send RDATA, or a similar request, to the micro NOC 76A. In a third operation 264, the micro NOC 76A may deposit the RDATA or similar request into the group of LUTRAM 98A specified by the user logic 92. In a fourth operation 266, the micro NOC 76A may receive a signal from the group 98A indicating how many addresses have been read. In a fifth operation 268, the R channel may indicate completion of the read command. In some embodiments, the read response at the AXI interface 112A may pack multiple read responses to the fabric using the unused RDATA field, as described above. Further, similar operations may be used to complete write commands.

Further, in some embodiments, when the micro NOC 76A is not writing to the group 98A, programmable fabric of the integrated circuit device 12 may read or write to the group 98A through soft logic of the programmable fabric. For example, in a shallow FIFO operation, the programmable fabric of the integrated circuit 12 may read out the data in the group 98A after the micro NOC 76A has completed the operation 268 of a write command. Further, in some embodiments, the group 98B may also be read/written to by the micro NOC 76A using the operations 260, 262, 264, 266, and 268. In embodiments with data written to both the group 98A and 98B, the data may be processed by the user logic data processing and compute plane at half the frequency as in embodiments in which only one of the groups 98 are read.

Figure 16:
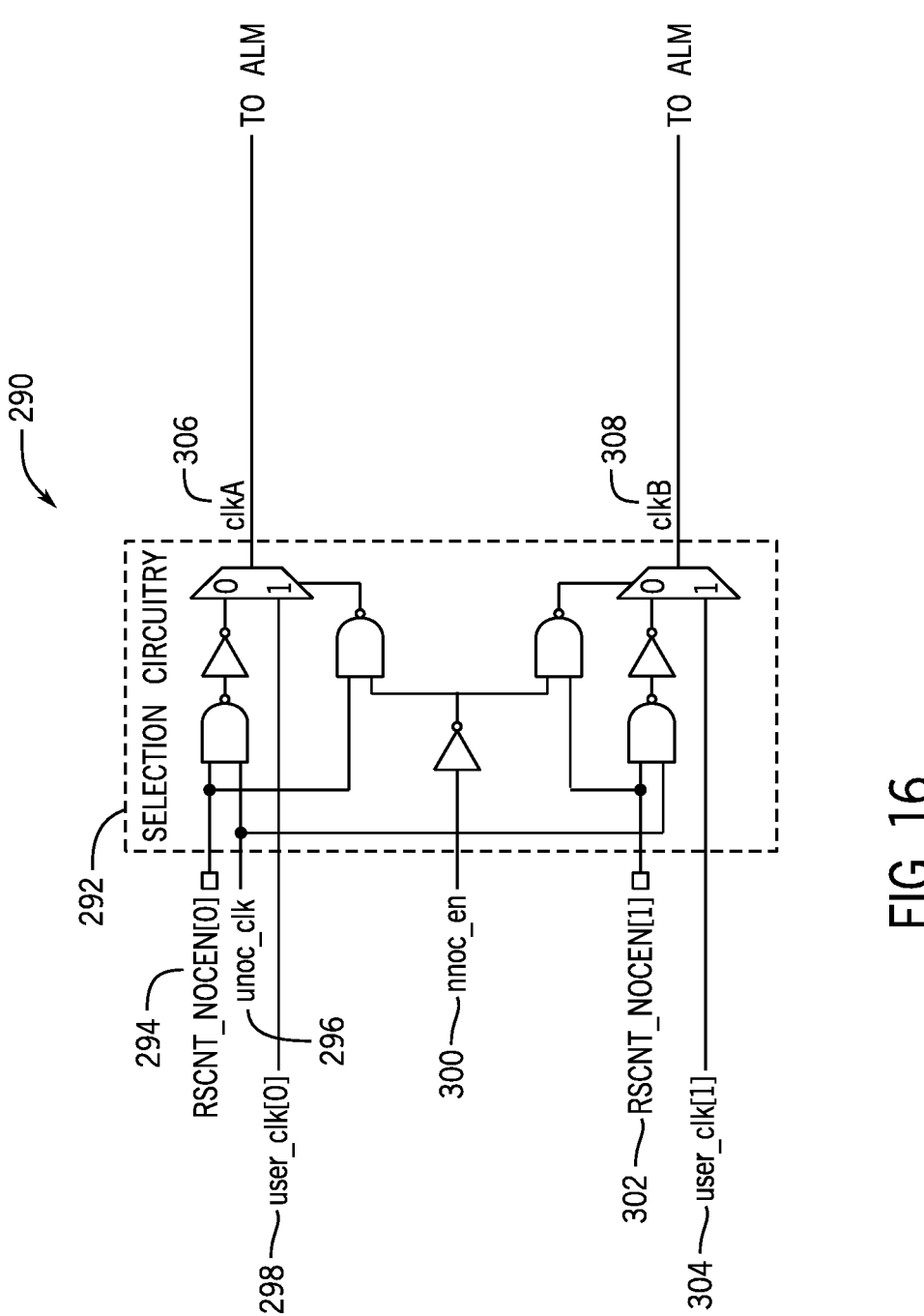
FIG. 16 is a schematic diagram of selection circuitry of the integrated circuit device of FIG. 1, in accordance with an embodiment of the present disclosure.

Turning now to FIG. 16, a diagram 290 illustrates an example embodiment of selection circuitry 292 used to determine operations of the ALMs 63. For example, in some embodiments, the ALMs 63 may operate in a NOC mode in which micro NOCs 76 may read from or write to LUTRAM 66 and ALM registers 64, as has been described. Further, the ALMs 63 may operate in a user mode in which a user of the integrated circuit device 12 may control operations of the ALMs 63. In other words, in user mode, the integrated circuit device 12 may process data, for example, based on how the LUTRAM 66, ALM registers 64, or both have been programmed (e.g., as written during NOC mode). Accordingly, the selection circuitry 292 may receive several inputs, such as RSCNT_NOCEN signals 294, 302, clock signals 296, 298, 304, and micro NOC enable signal 300. The input NOC enable signal 300 may be indicative of whether the ALMs 63 is in the NOC mode or the user mode. Further, the RSCNT_NOCEN signals 294, 302 may be CRAM bits that may signal the power gating of clock signal 296 when the ALMs 63 is in a user mode. Further, the clock signals 296, 298, 304 may be used to properly time operations of the selection circuitry 292. The selection circuitry 292 may output a clock signal 306 and a second clock signal 308 to the ALMs 63 according to the operation mode of the LUTRAMs 66 and ALMs registers 64. Further, in some embodiments, the selection circuitry 292 may perform operations or other general deglitching techniques to flush out the clock signals 306, 308 when the ALMs 63 switches modes of operation between the user mode and the NOC mode to remove timing glitches.

Figures 17A, 17B:
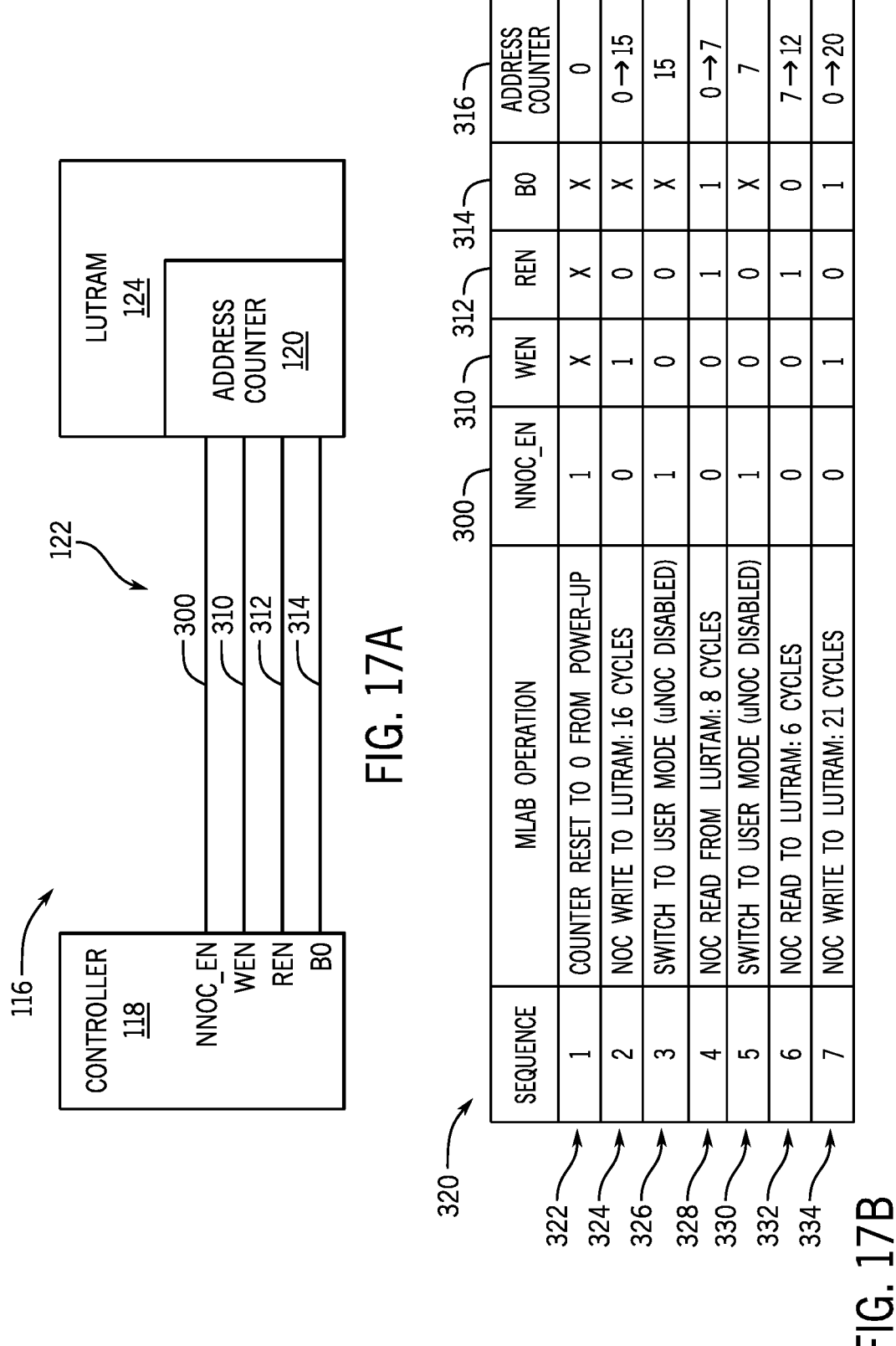
FIG. 17A is a diagram of circuitry of the integrated circuit device of FIG. 1, in accordance with an embodiment of the present disclosure.
FIG. 17B is a table of operations of the circuitry of FIG. 17A, in accordance with an embodiment of the present disclosure.
Figure 18:
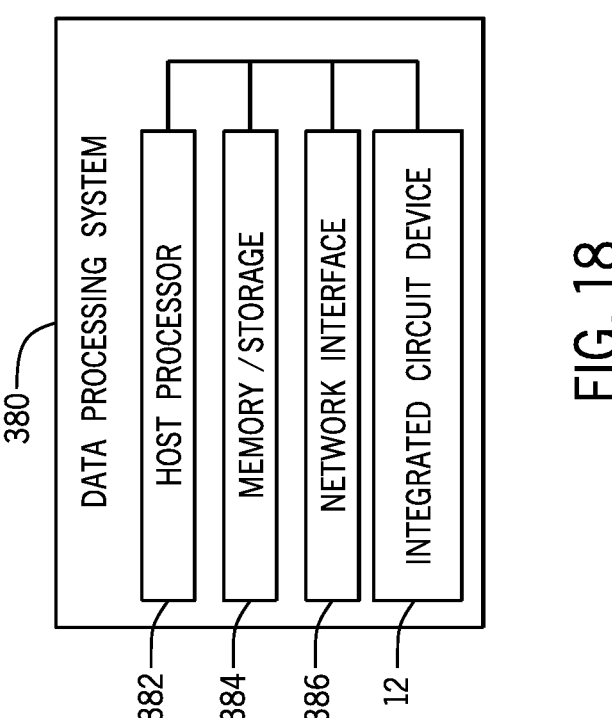
FIG. 18 is a block diagram of a data processing system that includes the integrated circuit device of FIG. 1, in accordance with an embodiment of the present disclosure.

Turning now to a discussion of FIG. 17A, in some embodiments, the address counter 120 may receive input signals 300, 310, 312, and 314 to perform operations of the LUTRAM 124 read and write operations. For example, the NOC enable signal 300 may be used to indicate whether the controller 118 is in a NOC mode or a user mode. The signal 310 may be a write_enable signal to indicate whether to write to the LUTRAM 124, and the signal 312 may be a read_enable signal to indicate whether to read from the LUTRAM 124. Further, the signal 314 may be a reset signal to indicate whether to reset an address counter. In some embodiments, the address counter 120 may identify the location in the LUTRAM 124 to run the operations of the controller 118. Further, it should be noted that although the example illustrated in FIG. 17A shows operations of the controller 118 to the LUTRAM 124, in some embodiments, similar operations may apply to operations to the ALM registers 64 of one or more of the ALMs 63.

The FIG. 17B illustrates a table 320 describing operations of the address counter 120 according to the input signals 300, 310, 312, and 314. In a first sequence 322, only the NOC enable signal 300 is activated, and an operation of the first sequence 322 may include resetting an address counter 316 during power-up of the controller 118 or the integrated circuit device 12. In a second sequence 324, the write_enable signal 310 is activated, and the micro NOC 76 may write to the LUTRAM 124, for example, for sixteen cycles. Accordingly, the address counter 316 may indicate that sixteen cycles have been written. In a third sequence 326, the NOC enable signal 300 may be high (e.g., a logical one as compared to a logical zero) again, and the ALMs 63 mode may switch from a NOC mode to a user mode. In a sequence 328, the read enable signal 312 and the reset signal 314 may both be activated. Accordingly, the micro NOC 76 may read from the LUTRAM 124, for example, for eight cycles. Further, the signal 314 may reset the address counter 316, such that the micro NOC 76 may read the first eight addresses of the LUTRAM 124. In a sequence 330, the NOC enable signal 300 may be high, and the controller 118 may switch to a user mode again. In a sequence 332, the read enable signal 312 may be high, and the micro NOC 76 may read from the LUTRAM 124, for example, for six cycles. Accordingly the address counter 316 increases by six. In a sequence 334, the write_enable signal 310 and the reset signal 314 signal may be high. Accordingly, the micro NOC 76 may write to the LUTRAM 124, for example, for 21 cycles, and the address counter 316 may reset and count the twenty-one cycles starting from the 0 address of the LUTRAM 124. It should be noted that the table 320 is intended to be illustrative only, and the signals 300, 310, 312, and 314 may be used in a variety of ways to perform any number of read and write operations, in any order, on the LUTRAM 124 or any other appropriate circuitry, such as the ALM registers 64.

Keeping the foregoing in mind, the integrated circuit device 12 (e.g., integrated circuit device 12A) may be a part of a data processing system or may be a component of a data processing system that may benefit from use of the techniques discussed herein. For example, the integrated circuit device 12 may be a component of a data processing system 380, shown in FIG. 19. The data processing system 380 includes a host processor 382, memory and/or storage circuitry 384, and a network interface 386. The data processing system 380 may include more or fewer components (e.g., electronic display, user interface structures, application specific integrated circuits (ASICs)).

The host processor 382 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 380 (e.g., to perform machine learning, video processing, voice recognition, image recognition, data compression, database search ranking, bioinformatics, network security pattern identification, spatial navigation, or the like). The memory and/or storage circuitry 384 may include random-access memory (RAM), read-only memory (ROM), one or more hard drives, flash memory, or the like. The memory and/or storage circuitry 384 may be considered external memory to the integrated circuit device 12 and may hold data to be processed by the data processing system 380 and/or may be internal to the integrated circuit device 12. In some cases, the memory and/or storage circuitry 384 may also store configuration programs (e.g., bitstream) for programming a programmable fabric of the integrated circuit device 12. The network interface 386 may permit the data processing system 380 to communicate with other electronic devices. The data processing system 380 may include several different packages or may be contained within a single package on a single package substrate.

In one example, the data processing system 380 may be part of a data center that processes a variety of different requests. For instance, the data processing system 380 may receive a data processing request via the network interface 386 to perform machine learning, video processing, voice recognition, image recognition, data compression, database search ranking, bioinformatics, network security pattern identification, spatial navigation, or some other specialized task. The host processor 382 may cause a programmable logic fabric of the integrated circuit device 12 to be programmed with a particular accelerator related to requested task. For instance, the host processor 382 may instruct that configuration data (bitstream) be stored on the memory and/or storage circuitry 384 or cached in sector-aligned memory of the integrated circuit device 12 to be programmed into the programmable logic fabric of the integrated circuit device 12. The configuration data (bitstream) may represent a circuit design for a particular accelerator function relevant to the requested task.

The processes and devices of this disclosure may be incorporated into any suitable circuit. For example, the processes and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. An integrated circuit device, comprising: a programmable fabric comprising programmable logic, wherein the programmable logic comprises memory; a network-on-chip (NOC); and at least one micro NOC formed with hardened resources in the programmable fabric, wherein: the at least one micro NOC is communicatively coupled to the NOC and to the programmable logic; and the at least one micro NOC is configurable to selectively route data between the NOC and the programmable logic.

EXAMPLE EMBODIMENT 2. The integrated circuit device of example embodiment 1, wherein the memory comprises lookup table random-access memory (LU-TRAM), a register, or both.

EXAMPLE EMBODIMENT 3. The integrated circuit device of example embodiment 2, wherein: the programmable logic comprises a programmable logic element; and the memory is included in the programmable logic element.

EXAMPLE EMBODIMENT 4. The integrated circuit device of example embodiment 2, wherein the memory comprises the LUTRAM.

EXAMPLE EMBODIMENT 5. The integrated circuit device of example embodiment 2, wherein the memory comprises the register.

EXAMPLE EMBODIMENT 6. The integrated circuit device of example embodiment 1, wherein the at least one micro NOC is configurable to selectively route the data to the memory via the programmable logic.

EXAMPLE EMBODIMENT 7. The integrated circuit device of example embodiment 1, comprising a controller configurable to cause the data to be routed from the at least one micro NOC to the memory.

EXAMPLE EMBODIMENT 8. The integrated circuit device of example embodiment 1, wherein the controller is configurable to cause the integrated circuit device to: operate in a first mode of operation in which data is read from or written to the memory; and operate in a second mode of operation in which the programmable logic processes data based on values stored in the memory.

EXAMPLE EMBODIMENT 9. The integrated circuit device of example embodiment 8, comprising clock selection circuitry configurable to cause the memory to operate, based on whether the integrated circuit device is configured to operate in the first mode of operation or the second mode of operation, using a first clock rate or a second clock rate that is different than the first clock rate.

EXAMPLE EMBODIMENT 10. The integrated circuit device of example embodiment 8, wherein the memory comprises an address counter configurable to track one or more addresses in the memory to which data is written or from which data is read.

EXAMPLE EMBODIMENT 11. The integrated circuit device of example embodiment 1, wherein the programmable logic is configurable to perform double data rate (DDR), quadruple data rate (QDR), or DDR and QDR data transfers.

EXAMPLE EMBODIMENT 12. The integrated circuit device of example embodiment 1, wherein the integrated circuit device comprises a field-programmable gate array.

EXAMPLE EMBODIMENT 13. A programmable logic device, comprising: a programmable fabric comprising programmable logic, wherein the programmable logic comprises memory; a network-on-chip (NOC); and at least one micro NOC formed with hardened resources in the programmable fabric, wherein: the at least one micro NOC is communicatively coupled to the NOC and to the programmable logic; and the at least one micro NOC is configurable to selectively route data between the NOC and the memory.

EXAMPLE EMBODIMENT 14. The programmable logic device of example embodiment 13, memory comprises lookup table random-access memory (LUTRAM), a register of a programmable logic element, or both.

EXAMPLE EMBODIMENT 15. The programmable logic device of example embodiment 13, wherein the memory in included within an adaptive logic module formed in the programmable fabric.

EXAMPLE EMBODIMENT 16. The programmable logic device of example embodiment 13, wherein the programmable logic device comprises a field-programmable gate array.

EXAMPLE EMBODIMENT 17. A system comprising: a substrate; a first die mounted on the substrate; and a second die mounted on the substrate, comprising: a programmable fabric comprising programmable logic, wherein the programmable logic comprises memory; a network-on-chip (NOC); and at least one micro NOC formed with hardened resources in the programmable fabric, wherein: the at least one micro NOC is communicatively coupled to the NOC and to the programmable logic; and the at least one micro NOC is configurable to selectively route data between the NOC and the programmable logic.

EXAMPLE EMBODIMENT 18. The system of example embodiment 17, wherein the first die is an integrated circuit die.

EXAMPLE EMBODIMENT 19. The system of example embodiment 17, wherein the first die comprises a memory die or a storage die.

EXAMPLE EMBODIMENT 20. The system of example embodiment 17, wherein the system is implemented as a multi-die package.

What is claimed is:

1. An integrated circuit device, comprising:
a programmable fabric comprising programmable logic, wherein the programmable logic comprises memory;
a network-on-chip (NOC); and
at least one micro NOC formed with hardened resources in the programmable fabric, wherein:
the at least one micro NOC is communicatively coupled to the NOC and to the programmable logic; and
the at least one micro NOC is configurable to selectively route data between the NOC and the programmable logic.

2. The integrated circuit device of claim 1, wherein the memory comprises lookup table random-access memory (LUTRAM), a register, or both.

3. The integrated circuit device of claim 2, wherein:
the programmable logic comprises a programmable logic element; and
the memory is included in the programmable logic element.

4. The integrated circuit device of claim 2, wherein the memory comprises the LUTRAM.

5. The integrated circuit device of claim 2, wherein the memory comprises the register.

6. The integrated circuit device of claim 1, wherein the at least one micro NOC is configurable to selectively route the data to the memory via the programmable logic.

7. The integrated circuit device of claim 1, comprising a controller configurable to cause the data to be routed from the at least one micro NOC to the memory.

8. The integrated circuit device of claim 7, wherein the controller is configurable to cause the integrated circuit device to:
operate in a first mode of operation in which data is read from or written to the memory; and
operate in a second mode of operation in which the programmable logic processes data based on values stored in the memory.

9. The integrated circuit device of claim 8, comprising clock selection circuitry configurable to cause the memory to operate, based on whether the integrated circuit device is configured to operate in the first mode of operation or the second mode of operation, using a first clock rate or a second clock rate that is different than the first clock rate.

10. The integrated circuit device of claim 8, wherein the memory comprises an address counter configurable to track one or more addresses in the memory to which data is written or from which data is read.

11. The integrated circuit device of claim 1, wherein the programmable logic is configurable to perform double data rate (DDR), quadruple data rate (QDR), or DDR and QDR data transfers.

12. The integrated circuit device of claim 1, wherein the integrated circuit device comprises a field-programmable gate array.

13. A programmable logic device, comprising:
a programmable fabric comprising programmable logic, wherein the programmable logic comprises memory;
a network-on-chip (NOC); and
at least one micro NOC formed with hardened resources in the programmable fabric, wherein:
the at least one micro NOC is communicatively coupled to the NOC and to the programmable logic; and
the at least one micro NOC is configurable to selectively route data between the NOC and the memory.

14. The programmable logic device of claim 13, wherein the memory comprises lookup table random-access memory (LUTRAM), a register of a programmable logic element, or both.

15. The programmable logic device of claim 13, wherein the memory is included within an adaptive logic module formed in the programmable fabric.

16. The programmable logic device of claim 13, wherein the programmable logic device comprises a field-programmable gate array.

17. A system comprising:
a substrate;
a first die mounted on the substrate; and
a second die mounted on the substrate, comprising:
a programmable fabric comprising programmable logic, wherein the programmable logic comprises memory;
a network-on-chip (NOC); and
at least one micro NOC formed with hardened resources in the programmable fabric, wherein:
the at least one micro NOC is communicatively coupled to the NOC and to the programmable logic; and
the at least one micro NOC is configurable to selectively route data between the NOC and the programmable logic.

18. The system of claim 17, wherein the first die is an integrated circuit die.

19. The system of claim 17, wherein the first die comprises a memory die or a storage die.

20. The system of claim 17, wherein the system is implemented as a multi-die package.

\* \* \* \* \*